(12) United States Patent
Fu et al.

(10) Patent No.: US 11,099,676 B1
(45) Date of Patent: Aug. 24, 2021

(54) TOUCH MODULE, TOUCH DISPLAY PANEL AND TOUCH DISPLAY DEVICE

(71) Applicant: Shanghai Tianma Micro-Electronics Co., Ltd., Shanghai (CN)

(72) Inventors: Cheng Fu, Shanghai (CN); Jun Zhou, Shanghai (CN); Dongyun Sun, Shanghai (CN)

(73) Assignee: Shanghai Tianma Micro-Electronics Co., Ltd., Shanghai (CN)

( * ) Notice: Subject to any disclaimer, the term of this patent is extended or adjusted under 35 U.S.C. 154(b) by 0 days.

(21) Appl. No.: 16/912,954

(22) Filed: Jun. 26, 2020

(30) Foreign Application Priority Data

May 9, 2020 (CN) .......................... 202010386442.X

(51) Int. Cl.
*G06F 3/041* (2006.01)
*G06F 3/044* (2006.01)

(52) U.S. Cl.
CPC .......... *G06F 3/0412* (2013.01); *G06F 3/0446* (2019.05)

(58) Field of Classification Search
CPC .............................. G06F 3/0412; G06F 3/0446
See application file for complete search history.

(56) References Cited

U.S. PATENT DOCUMENTS

| 8,623,497 | B2* | 1/2014 | Kang | .................... G06F 3/0445 |
| | | | | 428/212 |
| 2018/0308903 | A1* | 10/2018 | Jeong | .................. H01L 27/3276 |
| 2019/0333971 | A1* | 10/2019 | Kishimoto | .......... H01L 51/5253 |
| 2020/0064968 | A1* | 2/2020 | Kim | ..................... G06F 1/1686 |
| 2020/0303684 | A1* | 9/2020 | Kim | ..................... H01L 51/5253 |
| 2021/0043690 | A1* | 2/2021 | Sim | ..................... G06F 3/04164 |

FOREIGN PATENT DOCUMENTS

| CN | 101452351 A | 6/2009 |
| CN | 207067963 U | 3/2018 |
| CN | 108415604 A | 8/2018 |

\* cited by examiner

*Primary Examiner* — Peter D McLoone
(74) *Attorney, Agent, or Firm* — Anova Law Group, PLLC

(57) ABSTRACT

A touch module, a touch display panel and a touch display device are provided. The touch module includes a substrate; at least one touch electrode layer disposed over the substrate; a first inorganic material layer disposed over a side of the touch electrode layer away from the substrate; at least one second inorganic material layer disposed over a side of the first inorganic material layer away from the touch electrode layer; and at least one third inorganic material layer disposed over a side of the touch electrode layer adjacent to the substrate. A refractive index of the touch electrode layer is greater than that of the first inorganic material layer; the refractive index of the first inorganic material layer is greater than that of the second inorganic material layer; and the refractive index of the touch electrode layer is greater than that of the third inorganic material layer.

20 Claims, 12 Drawing Sheets

TOUCH MODULE, TOUCH DISPLAY PANEL AND TOUCH DISPLAY DEVICE

CROSS-REFERENCES TO RELATED APPLICATIONS

This application claims priority of Chinese Patent Application No. 202010386442.X, filed on May 9, 2020, the entire contents of which are hereby incorporated by reference.

FIELD OF THE DISCLOSURE

The present disclosure generally relates to the field of display technology and, more particularly, relates to a touch module, a touch display panel and a touch display device.

BACKGROUND

Touch display panel is a display device with both display and command input functions. A user can directly touch the touch panel with his hand or an object, and the touch panel can detect the touched point and respond accordingly according to the area touched by the user. The touch panels are used in personal mobile communication devices and integrated information terminals, such as tablet computers, smart phones, super notebook computers, and other major human-computer interaction interfaces. Touch display panels include external touch display panels and in-cell touch display panels. The in-cell touch display panels are favored because of their lightness and thinness. With the development of the display technology, the requirements for the touch display panel in the display screen are becoming higher and higher.

Generally, the touch device installed on the display device of electronic equipment is mostly transparent, and can cooperate with the icons or instructions on the display screen for the user to touch and click to direct instructions to control the operation of the electronic equipment. The structure of the above-mentioned touch device includes touch electrode patterns formed by etching transparent conductive material layers on the top and bottom surfaces of a substrate. The amount of charges on the top and bottom touch electrodes on the substrate are changed when the user touches the touch device with a conductive substance or a finger, and a control command is generated in response to the touched position. Although the patterns of the touch (electrodes) layer are made of a transparent conductive material, its light transmittance is not good. Further, there are slits between the patterns of adjacent touch layers. Thus, the optical path difference of the light reflected to the human eyes from the patterns and slits of the touch layer under the irradiation of the ambient ling is inconsistent. Accordingly, the patterns of the touch layer are easily noticeable by the human eyes, and the clarity of the display screen is adversely affected, and the user experience is inevitably affected.

Therefore, there is a need to provide a touch module, a touch display panel and a touch display device that can reduce reflectivity of the patterns of the touch layer to reflect the light to the human eyes under the influence of the ambient light, to cause the patterns of the touch layers to be more difficult for the user to perceive, and to reduce the influence of the light reflected by the patterns of the touch layer on the display screen. The disclosed touch module, touch display panel, and touch display device are directed to solve one or more problems set forth above and other problems in the art.

BRIEF SUMMARY OF THE DISCLOSURE

One aspect of the present disclosure provides a touch module. The touch module may include a substrate; at least one touch electrode layer disposed over one side of the substrate; a first inorganic material layer disposed over a side of the at least one touch electrode layer away from the substrate; at least one second inorganic material layer disposed over a side of the first inorganic material layer away from the touch electrode layer; and at least one third inorganic material layer disposed over a side of the touch electrode layer adjacent to the substrate. A refractive index of the touch electrode layer is greater than a refractive index of the first inorganic material layer; the refractive index of the first inorganic material layer is greater than a refractive index of the at least one second inorganic material layer; and the refractive index of the touch electrode layer is greater than a refractive index of the at least one third inorganic material layer.

Another aspect of the present disclosure provides a touch display panel. The touch display panel may include a display module and a touch module. The touch module may include a substrate; at least one touch electrode layer disposed over one side of the substrate; a first inorganic material layer disposed on a side of the touch electrode layer away from the substrate; at least one second inorganic material layer disposed over a side of the first inorganic material layer away from the at least one touch electrode layer; and at least one third inorganic material layer disposed over a side of the at least one touch electrode layer adjacent to the substrate. A refractive index of the touch electrode layer is greater than a refractive index of the first inorganic material layer; the refractive index of the first inorganic material layer is greater than a refractive index of the at least one second inorganic material layer; and the refractive index of the at least one touch electrode layer is greater than a refractive index of the at least one third inorganic material layer.

Another aspect of the present disclosure provides a touch display device. The touch display device may include a touch display panel. The touch display panel may include a display module and a touch module. The touch module may include a substrate; at least one touch electrode layer disposed over one side of the substrate; a first inorganic material layer disposed over a side of the at least one touch electrode layer away from the substrate; at least one second inorganic material layer disposed over a side of the first inorganic material layer away from the at least one touch electrode layer; and at least one third inorganic material layer disposed over a side of the at least one touch electrode layer adjacent to the substrate. A refractive index of the at least one touch electrode layer is greater than a refractive index of the first inorganic material layer; the refractive index of the first inorganic material layer is greater than a refractive index of the at least one second inorganic material layer; and the refractive index of the at least one touch electrode layer is greater than a refractive index of the at least one third inorganic material layer.

Other aspects of the present disclosure can be understood by those skilled in the art in light of the description, the claims, and the drawings of the present disclosure.

BRIEF DESCRIPTION OF THE DRAWINGS

The following drawings are incorporated in and constitute a part of the specification, illustrating embodiments of the present disclosure, and together with the detailed descriptions serve to explain the mechanism of the present disclosure.

DETAILED DESCRIPTION

Figure 1:
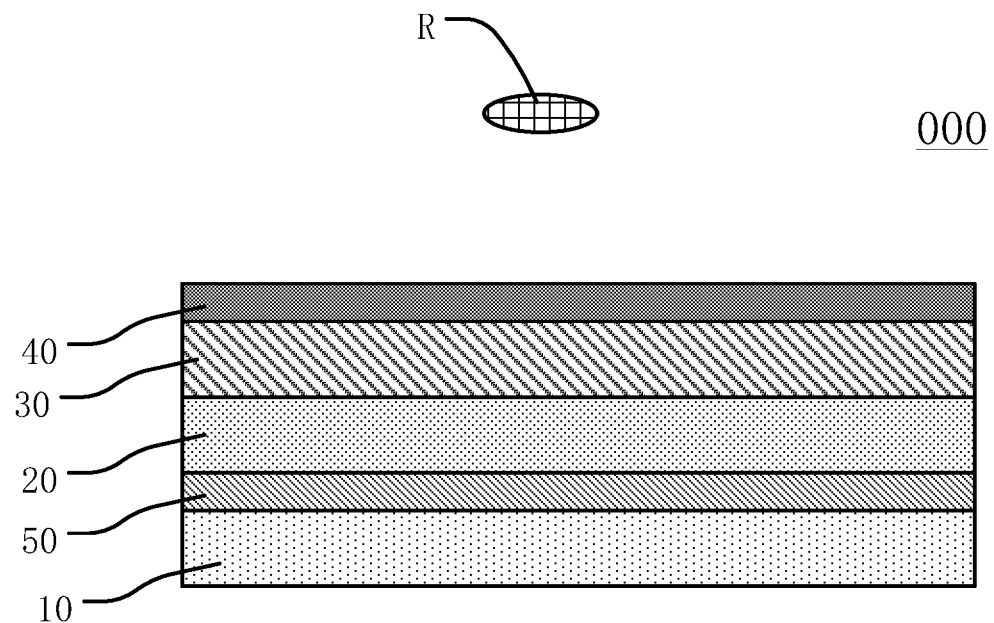
FIG. 1 illustrates a cross-sectional view of a portion of an exemplary touch module consistent with various disclosed embodiments of the present disclosure.

Reference will now be made in detail to exemplary embodiments of the disclosure, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all the embodiments of the present disclosure. Based on the disclosed embodiments, persons of ordinary skill in the art may derive other embodiments consistent with the present disclosure, all of which are within the scope of the present disclosure. Further, in the present disclosure, the disclosed embodiments and the features of the disclosed embodiments may be combined when there are no conflicts.

The following description of at least one exemplary embodiment is actually merely illustrative, and in no way serves as any limitation on the disclosure and its applications or uses.

Techniques, methods and equipment known to those of ordinary skill in the related art may not be discussed in detail. However, where appropriate, the techniques, methods and equipment should be considered as parts of the specification.

In all embodiments shown and discussed herein, any specific values should be interpreted as merely exemplary and not limitations. Therefore, other examples of the exemplary embodiments may have different values.

It should be noted that similar reference numerals and letters indicate similar items in the following drawings. Thus, once an item is defined in one drawing, there is no need to discuss it further in subsequent drawings.

In the existing techniques, to prevent human eyes from perceiving the patterns of touch electrodes, an index matching (IM) film, also known as a blanking film, is added between the touch layer and the protective cover plate or glass to reduce the reflectivity of the patterns of touch electrodes made of conductive oxide so as to reduce the visual contrast between the patterns and other areas such that the lines etching the patterns of the touch electrodes become lighter under the ambient light, and the patterns can be hidden and invisible. However, although the IM film can be used to achieve the blanking of the patterns, for the current customers, more and more stringent low-reflectivity requirements are proposed. The reflectivity in such a configuration has gradually failed to meet the low-reflectivity requirements, and it is urgent to develop a touch module having a lower reflectivity to meet higher requirements. The present disclosure provides a touch module, a touch display panel and a touch display device. The overall reflectivity of the touch module may approach 0%.

FIG. 1 illustrates a cross-sectional view of an exemplary touch module consistent with various disclosed embodiments of the present disclosure. As shown in FIG. 1, the touch module 000 may include a substrate 10, at least one touch electrode layer 20 disposed over one side of the substrate 10; a first inorganic material layer 30 disposed over the side of the at least one touch electrode layer 20 away from the substrate 10; at least one second inorganic material layer 40 disposed over the side of the first inorganic material layer 30 away from the at least one touch electrode layer 20; and at least one third inorganic material layer 50 disposed over the side of the at least one touch electrode layer 20 adjacent to the substrate 10.

The refractive index of the touch electrode layer 20 may be greater than the refractive index of the first inorganic material layer 30. The refractive index of the first inorganic material layer 30 may be greater than the refractive index of the second inorganic material layer 40. The refractive index of the touch electrode layer 20 may be greater than the refractive index of the third inorganic material layer 50.

In the touch module 000 provided by present disclosure, the touch electrode layer 20 may be disposed over the substrate 10; and the touch control mechanism of the touch electrode layer 20 may be a mutual-capacitance mode or a self-capacitance mode; and the control mechanism is not specifically limited in the present disclosure. Whether the touch electrode layer 20 is used in the mutual-capacitance mode or the touch electrode layer 20 is used in the self-capacitance mode, the touch electrode layer 20 may need to be provided with a plurality of electrode blocks (patterns) through a slitting process (not shown).

In one embodiment, the touch electrode layer 20 may be made of a transparent conductive material. The first inorganic material layer 30 disposed over the side of the touch electrode layer 20 away from the substrate 10 may function as an insulation protection. The second inorganic material layer 40 disposed over the side of the first inorganic material layer 30 away from the touch electrode layer 20 may reduce the reflectivity of the entire touch module (the ratio of the light radiation energy of the light reflected by the touch module 000 to the total light radiation energy may be referred to as a reflectivity). The third inorganic material layer 50 disposed over the side of the touch electrode layer 20 adjacent to the substrate 10 may eliminate the shadow.

In the existing technology, when a user views a display device having the touch module under the influence of the ambient light, the adjacent electrode blocks of the touch electrode layer 20 have an etched slit. Thus, under the ambient light irradiation, the optical path difference between the light reflected by the electrode blocks and the light reflected by the etched slit to the human eyes are inconsistent. Accordingly, when the ambient light is incident on and finally reflected to the user for viewing, there will be a clear stripe shadow at the etched slit, and the etched slit between the touch electrodes is easy to be noticed by human eyes. When the touch module is used in the display panel, the appearance of the display device is affected by the etched slits.

In the touch module 000 present in the present disclosed embodiment, on the premise that the touch electrode layer 20 is invisible through the third inorganic material layer 50 (the third inorganic material layer may eliminate the shadows of the patterns of the touch electrode layer 20), the refractive index of the touch electrode layer 20 may be greater than the refractive index of the first inorganic material layer 30; the refractive index of the first inorganic material layer 30 may be greater than the refractive index of the second inorganic material layer 40; and the refractive index of the touch electrode layer 20 may be greater than the refractive index of the third inorganic material layer 50. Such a refractive index matching may have the optical effect of reducing the reflectivity. Optionally, the matching of the refractive indexes may be achieved by adjusting the film thickness, or film composition, etc. of the first inorganic material layer 30, the second inorganic material layer 40, and the third inorganic material layer 50. In particular, along the direction in which the touch electrode layer 20 directs to the second inorganic material layer 40 (i.e., a direction in which the touch electrode layer 20 directs to the incident ambient light), the refractive index of each film layer of the touch module 000 may gradually decrease. The refractive index of the second organic layer 40 obtained by adjusting the thickness of the second inorganic material layer 40 may be between the refractive index of the first inorganic material layer 30 and the refractive index of the optical adhesive layer (the optical adhesive layer may be used to fix the touch module 000 with other film layers, such as a cover plate), and the second inorganic material layer 40 may become a transition layer. Along the direction in which the touch electrode layer 20 directs to the substrate 10 (i.e., a direction the touch electrode layer 20 directs away from the incident ambient light), the refractive index of each film layer of the touch module 000 may also gradually decrease. The refractive index of the third inorganic material layer 50 obtained by adjusting the thickness of the third inorganic material layer 50 may be between the refractive index of the touch electrode layer 20 and the refractive index of the substrate 10, and the third inorganic material layer may also become a transition layer. When the ambient light is incident on the upper surface of the second inorganic material layer 40, a portion of the light may be directly reflected by the upper surface of the second inorganic material layer 40 to the human eyes (the position "R" in FIG. 1), and a portion of the light may need to be incident on each film layer of the touch module 000. Because two film layers made of different materials may have a refractive interface and the touch module 000 is composed of multiple layers, the incident light may generate reflective light at the interface of every two layers. By designing and matching the thickness of each film layer, the vector light reflected at the interfaces of different film layers may superimpose and cancel each other when the final incident light enters the human eyes so as to cause the optical path difference between the light directly reflected by the upper surface of the second inorganic material layer 40 and the light reflected by the touch electrode layer 20 and other film layers to be as consistent as possible. Accordingly, the effect of the electrode block patterns of the touch electrode layer 20 on the reflectivity of the entire module may be minimized to further reduce the reflectivity, and the lowest reflection effect may be achieved.

Figure 2:
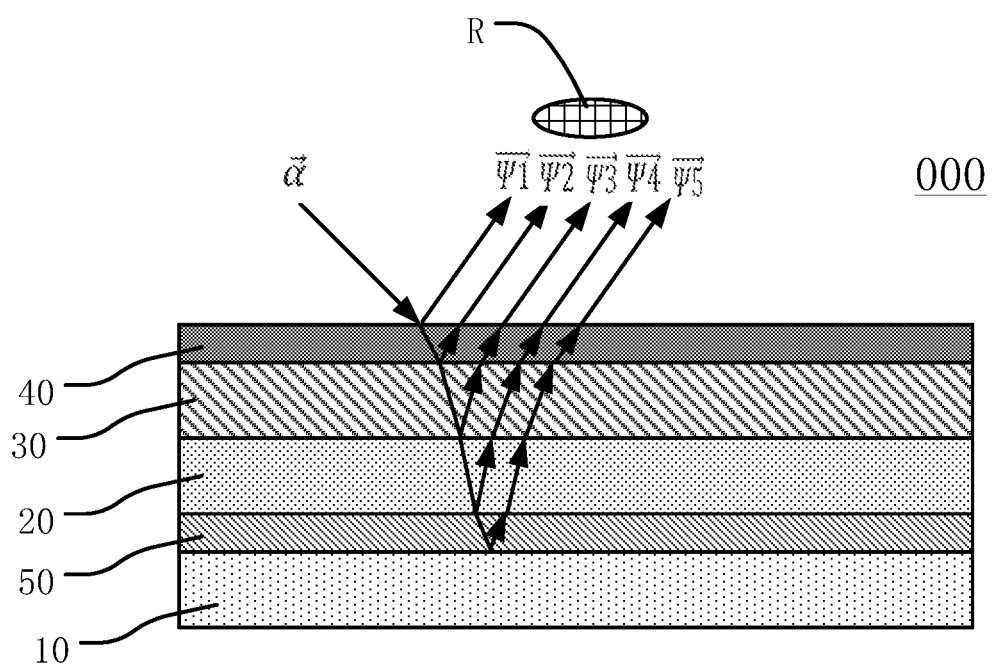
FIG. 2 illustrates a mechanism for an exemplary touch module to reduce the reflectivity consistent with various disclosed embodiments of the present disclosure.

The mechanism of designing and matching the thickness of each film layer to cause the vector light reflected at the interfaces of different film layers to superimpose and cancel each other when the final incidence light interferes in the human eyes to cause the optical path difference between the light directly reflected by the upper surface of the second inorganic material layer 40 and the light reflected by the touch electrode layer 20 and other film layers to be as consistent as possible may be referred to FIG. 2. FIG. 2 illustrates the mechanism for a touch module to reduce reflectivity consistent with various disclosed embodiments of the present disclosure.

As shown in FIG. 2, the incident light $\vec{\alpha}$ may be reflected on the upper surface of the second inorganic material layer 40 to generate the first reflected light $\vec{\Psi1}$ that is incident on the human eyes. The incident light $\vec{\alpha}$ may pass through the second inorganic material layer 40 and be reflected on the upper surface of the first inorganic material layer 30 to finally generate the second reflected light $\vec{\Psi2}$ that is incident on the human eyes. The incident light $\vec{\alpha}$ may pass through the second inorganic material layer 40 and the first inorganic material layer 30 and be reflected on the upper surface of the touch electrode layer 20 to finally generate the third reflected light $\vec{\Psi 3}$ that is incident on the human eyes. The incident light $\vec{\alpha}$ may pass through the second inorganic material layer 40, the first inorganic material layer 30, and the touch electrode layer 20 and be reflected on the upper surface of the third inorganic material layer 50 to finally generate the fourth reflected light $\vec{\Psi 4}$ that is incident on the human eyes. The incident light $\vec{\alpha}$ may pass through the second inorganic material layer 40, the first inorganic material layer 30, the touch electrode layer 20, and the third inorganic material layer 50 and be reflected on the upper surface of the substrate 10 to finally generate the fifth reflected light $\vec{\Psi 5}$ that is incident on the human eyes. The first reflected light $\vec{\Psi 1}$, the second reflected light $\vec{\Psi 2}$, and the third reflected light $\vec{\Psi 3}$, the fourth reflected light $\vec{\Psi 4}$ and the fifth reflected light $\vec{\Psi 5}$ may have a same optical path difference. In particular, the vector light reflected at the interfaces of different layers may be superimposed in the vector direction when they are finally incident on the human eyes to generate interference; and it may cause the optical path difference between the light directly reflected on the upper surface of the second inorganic material layer 40 and the light reflected by the film layers after passing through the film layers, such as the touch electrode layer 20, to be as consistent as possible.

It should be noted that FIG. 1 may be only a schematic drawing of the film layer structure of the touch module 000, only to illustrate the refractive index relationship and position relationship of each film layer. In specific implementation, the film layer structure may not be a structure laid on the entire surface. For example, the touch electrode layer 20 may have a plurality of electrode block patterns. For details, reference may be made to the structure of a touch module that implements a touch function in the prior art.

In one embodiment, at least one second inorganic material layer 40 may be disposed on the side of the first inorganic material layer 30 away from the touch electrode layer 20, and at least one third inorganic material layer 50 may be disposed on the side of the touch electrode layer 20 adjacent to the substrate 10. As shown in FIG. 1, the number of the second inorganic material layer 40 and the third inorganic material layer 50 may be both one. In another embodiment, as shown in FIG. 3, the number of the second inorganic material layers 40 and the third inorganic material layers 50 may be both two.

Figure 3:
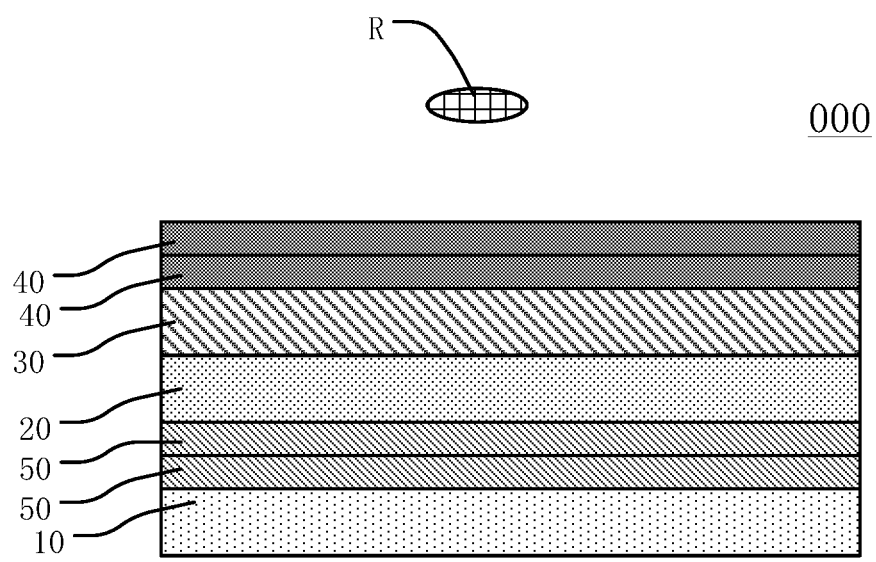
FIG. 3 illustrates a cross-sectional view of a portion of another exemplary touch module consistent with various disclosed embodiments of the present disclosure.

FIG. 3 illustrates a cross-sectional view of a portion of another exemplary touch module consistent with various disclosed embodiments of the present disclosure. In some embodiments, the number of the second inorganic material layers 40 and the third inorganic material layers 50 may be three (not shown). The number of the second inorganic material layers 40 and the third inorganic material layers 50 in the present disclosure may be two or more respectively, such that the second inorganic material layer 40 and the third inorganic material layer 50 may be used as the refractive index transition layers having a better effect. Accordingly, the precision of adjusting the reflectivity of the entire touch module 000 may be increased, and the adjusting of the reflectivity may be more obvious and better. In the present disclosure, the number of the second inorganic material layers 40 and the third inorganic material layers 50 are not specifically limited, as long as it may satisfy that, along the direction in which the second inorganic material layer 40 directs to the touch electrode layer 20, the refractive index of each film layer of the touch module 000 may gradually decrease, and along the direction in which the touch electrode layer 20 directs to the substrate 10, the refractive index of each film layer of the touch module 000 may also gradually decrease.

Figure 4:
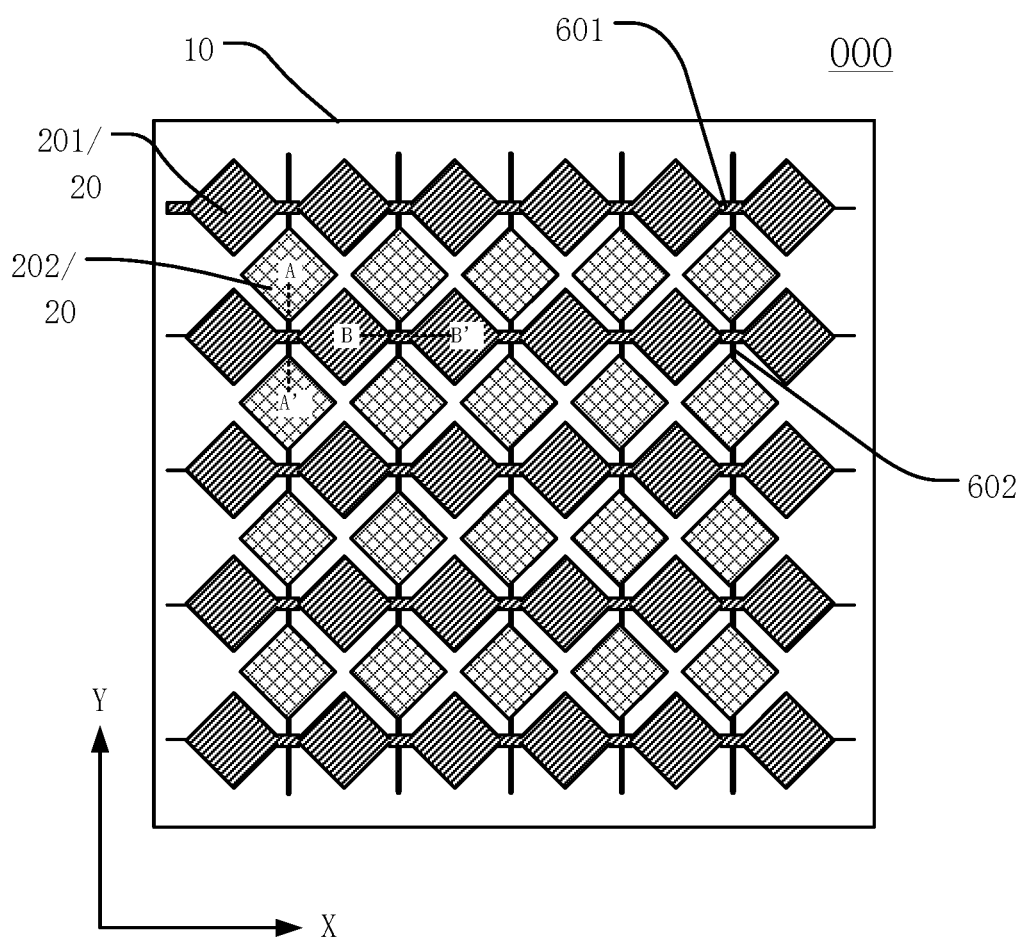
FIG. 4 illustrates a planar view of an exemplary touch module consistent with various disclosed embodiments of the present disclosure.
Figure 5:
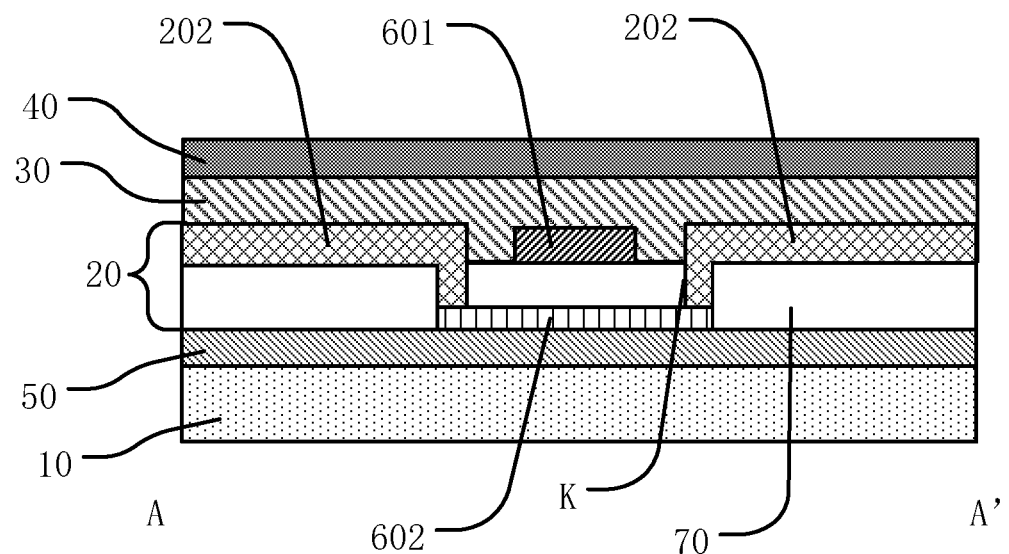
FIG. 5 illustrates an A-A'-sectional view in FIG. 4 consistent with various disclosed embodiments of the present disclosure.
Figure 6:
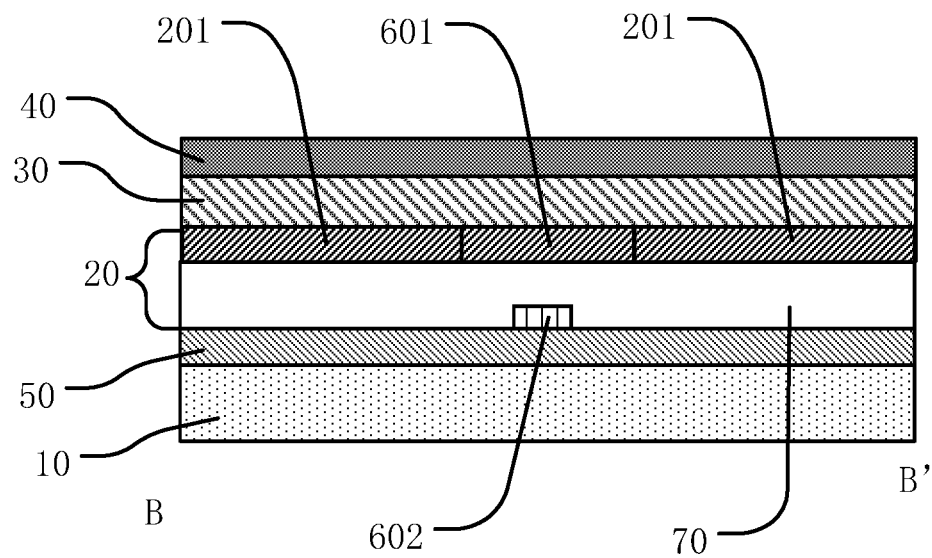
FIG. 6 illustrates a B-B'-sectional view in FIG. 4 consistent with various disclosed embodiments of the present disclosure.
Figure 7:
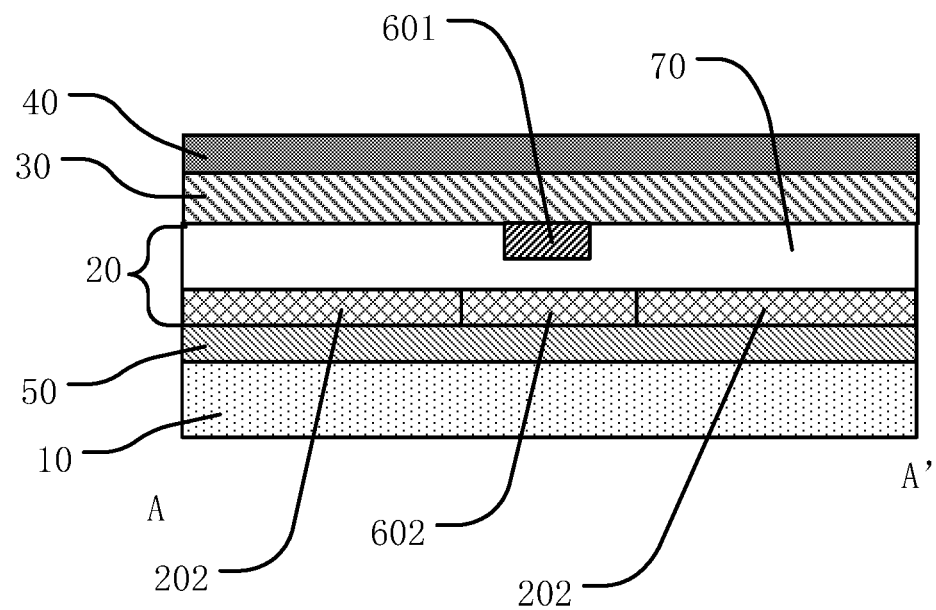
FIG. 7 illustrates another A-A'-sectional view in FIG. 4 consistent with various disclosed embodiments of the present disclosure.

FIG. 4 is a planar view of a touch module consistent with various disclosed embodiments of the present disclosure. FIG. 5 is an A-A'-sectional view in FIG. 4, and FIG. 6 is a B-B'-sectional view in FIG. 4. FIG. 7 is another A-A'-sectional view in FIG. 4, and FIG. 8 is another B-B'-sectional view in FIG. 4

In one embodiment, the touch mechanism of the touch module 000 may be a mutual-capacitance mode. The touch electrode layer 20 may include a plurality of first touch electrodes 201 arranged as a matrix and a plurality of second touch electrodes 202 arranged as a matrix. In particular, a plurality of first touch electrodes 201 may be sequentially arranged as first touch electrode rows along the first direction X; a plurality of second touch electrodes 202 may be sequentially arranged along the first direction X to form second touch electrode rows; a plurality of first touch electrodes 201 may be sequentially arranged along a second direction Y to form first touch electrode columns; and a plurality of second touch electrodes 202 may be sequentially arranged along the second direction Y to form second touch electrode columns.

In one embodiment, as shown in FIGS. 4-6, the plurality of first touch electrodes 201 and the plurality of second touch electrodes 202 may be disposed in the same layer (although two filling patterns are shown in the figures, the touch electrodes are disposed in the same layer). Two adjacent first touch electrodes 201 in a same row of the matrix may be electrically connected through a first connection part 601, and two adjacent second touch electrodes 202 in a same column of the matrix may be electrically connected through a second connection part 602. The first connection part 601 and the first touch electrode 201 may be disposed in a same layer. In particular, the first connection part 601, the first touch electrodes 201, and the second touch electrodes 202 may be disposed on the same layer. A fifth inorganic material layer 70 (not filled in the figure) may be disposed between the second connection parts 602 and the first touch electrodes 201; and the two adjacent second touch electrodes 202 may be electrically connected through the connection via "K" formed in the fifth inorganic material layer 70.

Figure 8:
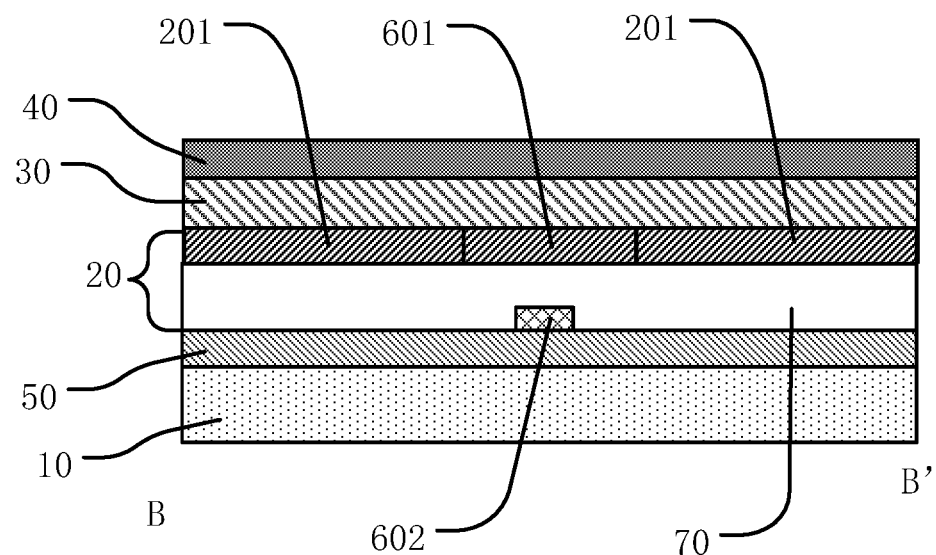
FIG. 8 illustrates another B-B'-sectional view in FIG. 4 consistent with various disclosed embodiments of the present disclosure.

In some embodiments, as shown in FIG. 4, FIG. 7 and FIG. 8, the first touch electrodes 201 and the second touch electrodes 202 may also be disposed in different layers, and two adjacent first touch electrodes 201 in the same row of the matrix may be electrically connected through the connection part 601. The first connection part 601 and the first touch electrodes 201 may be disposed in the same layer. Two adjacent second touch electrodes 202 in the same column of the matrix may be electrically connected through the second connection part 602; and the second connection part 602 and the second touch electrodes 202 may be disposed the same layer. The first touch electrodes 201 and the second touch electrodes 202 may be insulated from each other by the fifth inorganic material layer 70. The touch control mechanism of the mutual-capacitance mode may be based on the capacitance between the first touch electrode 201 and the second touch electrode 202. When an excitation signal is applied to the first touch electrode 201, due to the mutual-capacitance, the second touch electrode 202 may sense and receive the excitation signal. The value of the received signal may be related to the phase shift and the frequency of the excitation signal and the value of the mutual capacitance so as to realize the touch detection. It should be noted that only the diamond-shaped blocks are used for illustrating the touch electrode blocks in the drawings, the touch electrodes may also have other shapes; and the shapes of the touch electrodes are not limited herein.

Figure 9:
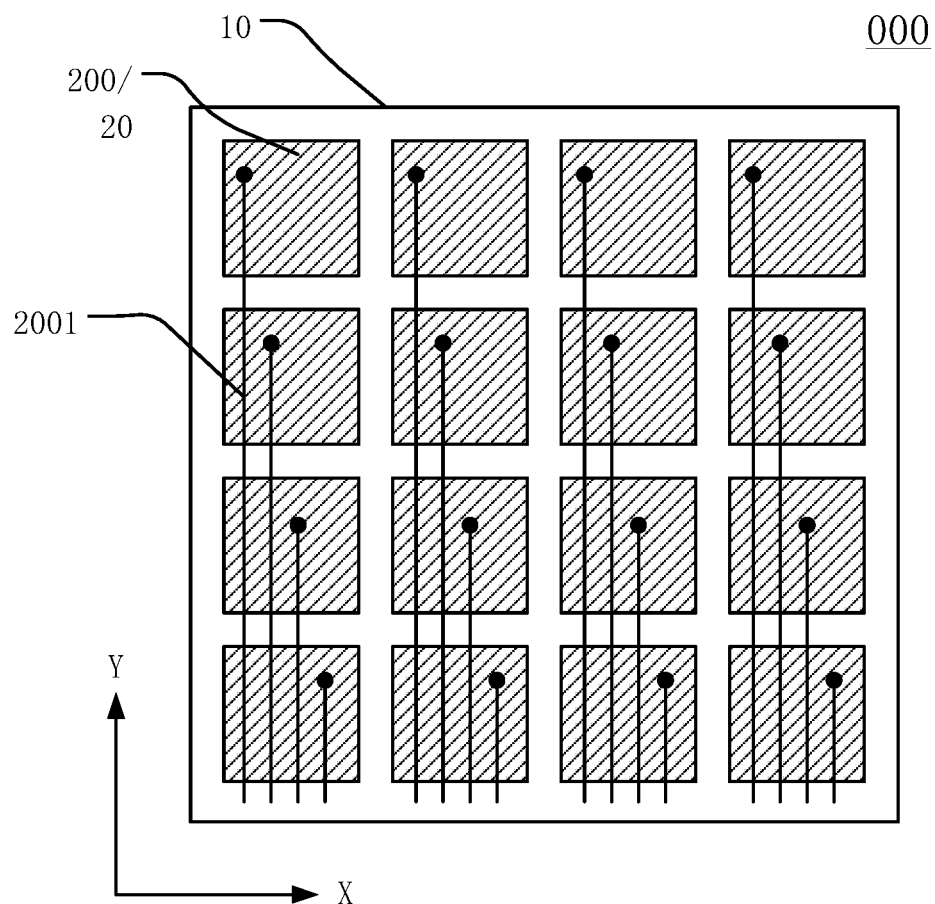
FIG. 9 illustrates a planar view of another exemplary touch module consistent with various disclosed embodiments of the present disclosure.

FIG. 9 illustrates a planar view of another exemplary touch module consistent with various disclosed embodiments of the present disclosure. As shown in FIG. 9, in one embodiment, the touch control mechanism of the touch module 000 may be a self-capacitance mode. The touch electrode layer 20 may include a plurality of touch electrode blocks 200 arranged as a matrix. Each touch electrode block 200 may be connected to at least one touch signal line 2001. The touch control mechanism of the self-capacitance mode may be based on capacitance between the touch electrode block 200 and the corresponding grounded electrode. When an excitation signal is applied to the touch electrode block 200 through the touch signal line 2001, due to the existence of the self-capacitance, an electric field that changes with the excitation signal may be generated between the touch electrode block 200 and the grounded electrode, and the touch detection may be realized.

The touch module 000 may be a film structure that may realize the mutual-capacitance mode, or a film structure that may realize the self-capacitance mode; and it may only need to meet the requirement that, along the direction in which the touch electrode layer 20 directs the second inorganic material layer 40, the refractive index of each film layer of the touch module 000 may gradually decrease, and along the direction in which the touch electrode layer 20 direct the substrate 10, the refractive index of each film layer of the touch module 000 may also gradually decrease. Further, the side of the touch electrode layer 20 away from the substrate 10 may have the first inorganic material layer 30 that may function as an insulation protection; the side of the first inorganic material layer 30 away from the touch electrode layer 20 may have the second inorganic material layer 40 that may function to reduce the reflectivity of the entire module; and the side of the touch electrode layer 20 adjacent to the substrate 10 may have the third inorganic material layer 50 used for eliminating the shadow. On the premise that the electrode layer 20 may be invisible through the third inorganic material layer, the reflectivity of the touch module 000 may be reduced and the display effect of the display device using the touch module 000 may be enhanced. In one embodiment, the matching of the refractive indexes of the film layers of the touch module may be achieved by adjusting the thickness and/or the composition, etc., of the first inorganic material layer 30, the second inorganic material layer 40, and the third inorganic material layer 50.

Figure 10:
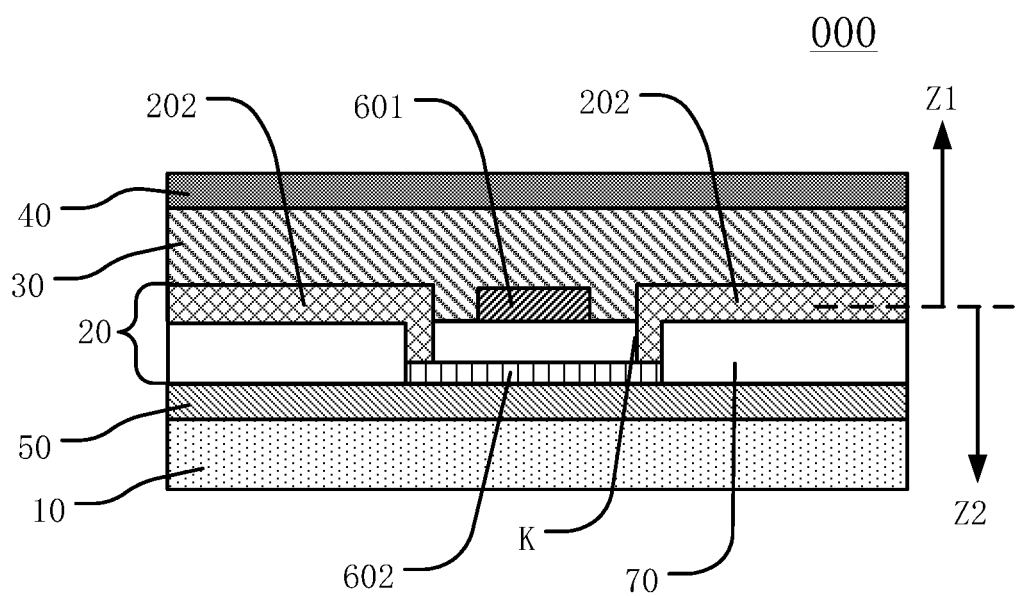
FIG. 10 illustrates a cross-sectional view of a portion of another exemplary display panel consistent with various disclosed embodiments of the present disclosure.

FIG. 10 illustrates a cross-sectional view of a portion of another exemplary touch module consistent with various disclosed embodiments of the present disclosure. In some embodiments, referring to FIGS. 1-8 and FIG. 10, the first inorganic material layer 30 and the fifth inorganic material layer 70 may be made of any one of $SiN_x$, and $SiON_x$, etc.

In some embodiments, the first inorganic material layer 30 may play the role of insulation protection, and the fifth inorganic material layer 70 may play the role of insulation. The thicknesses of the first inorganic material layer 30 and the fifth inorganic material layer 70 may be adjusted according to the requirements of the optical effect of reducing the reflectivity of the touch module by matches the refractive index of film layers of the touch module 000. The refractive indexes of the first inorganic material layer 30 and the fifth inorganic material layer 70 may be close to each other, and may be formed by a same coating process. In one embodiment, the first inorganic material layer 30 and the fifth inorganic material layer 70 may be made of any one of $SiN_x$ and $SiON_x$ so as to achieve the insulating effect, and also allow the refractive indexes of the first inorganic material layer 30 and the fifth inorganic material layer 70 to be both smaller than the refractive index of the first touch electrode 201 and the second touch electrode 202 of the touch electrode layer 20. Under such a configuration, the refractive index of each film layer of the touch module 000 may gradually decrease along the direction Z1 in which the first touch electrode 201 and the second touch electrode 202 of the touch electrode layer 20 direct to the second inorganic material layer 40 (because FIG. 10 is a cross-sectional view, the first touch electrode 201 is not shown in the figure, and can be understood by the embodiment of the mutual-capacitance mode in FIG. 4, and the first touch electrode 201 and the first connection part 601 are disposed in the same layer). Further, along the direction Z2 in which the first touch electrode 201 and the second touch electrode 202 of the touch electrode layer 20 direct to the substrate 10, the refractive index of each film layer of the touch module 000 may also gradually decrease. Accordingly, the purpose of reducing the reflectivity may be achieved.

It should be noted that the present embodiment is only to exemplify that the material of the first inorganic material layer 30 and the material of the fifth inorganic material layer 70 may be any one of SiNx and SiONx, but it is not limited to such materials, and may be other materials as long as it may play an insulating role and have a refractive index smaller than the refractive indexes of the first touch electrode 201 and the second touch electrode 202 of the touch electrode layer 20.

In some embodiments, referring to FIG. 10, the thickness of the first inorganic material layer 30 may be in a range of approximately 2576 angstroms-3024 angstroms; and the thickness of the second inorganic material layer 40 may be in a range of approximately 489 angstroms-591 angstroms. The thickness of the fifth inorganic material layer 70 may be in a range of approximately 1380 angstroms-1620 angstroms; and the thickness of the third inorganic material layer 50 may be in a range of approximately 452 angstroms-548 angstroms.

In such an embodiment, under the premise that the touch electrode layer 20 may be invisible through the third inorganic material layer 50, the reflectivity of the touch module may be reduced; and the display effect of the display device using the touch module 000 may be improved. To achieve such an effect, the thicknesses of the film layers may be designed to have a following combination. The thicknesses of the first inorganic material layer 30, the second inorganic material layer 40, the third inorganic material layer 50, and the fifth inorganic material layer 70 may be designed within the thickness range of the first inorganic material layer 30 that may be in a range of approximately 2576 angstroms-3024 angstroms. The thickness of the second inorganic material layer 40 may be in a range of approximately 489 angstroms-591 angstroms; the thickness of the fifth inorganic material layer 70 may be in a range of approximately 1380 angstroms-1620 angstroms; and the thickness of the third inorganic material layer 50 may be in a range of approximately 452 angstroms-548 angstroms. In one embodiment, the thicknesses of the first touch electrode 201 and the second touch electrode 202 of the touch electrode layer 20 may be in a range of approximately 425 angstroms-575 angstroms; and the thickness of the film layer where the second connection part 602 is disposed may be greater than or equal to 425 angstroms.

Figure 11:
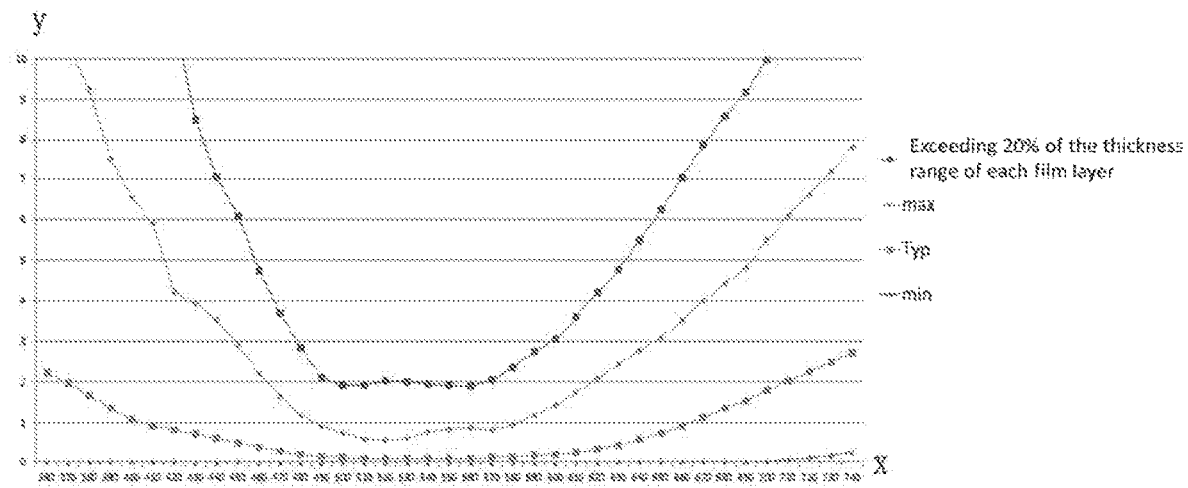
FIG. 11 illustrates a comparison of the reflectivity of an exemplary disclosed touch module and the reflectivity of an existing touch module.

In the touch module 000 of the present embodiment, a simulation experiment is performed on the thickness range of each film layer. FIG. 11 illustrates a comparison of the reflectivity of an exemplary disclosed touch module and the reflectivity of an existing touch module. As shown in FIG. 11, the abscissa x represents the wavelength of the ambient light in each wave band (unit is nm), and the ordinate y represents the reflectivity of the entire touch module (unit is %). The polyline "max" represents the reflectivity of the touch module 000 when the maximum value of each film thickness range is taken, and the polyline "min" represents the reflectivity of the touch module 000 when the minimum value of each film thickness range is taken. The polyline "Typ" represents the average value of the reflectivity of the touch module 000 after fitting all data in the above film thickness ranges. The polyline exceeding 20% of each film thickness range represents the reflectivity of the touch module 000 when the thickness of each film layer is not within the above range but in the existing technology. It can be clearly obtained from FIG. 11 that the thickness matching in the present disclosure may be able to obtain the optical property of reducing the reflectivity of the touch module. By properly adjusting the film thicknesses of the first inorganic material layer 30, the second inorganic material layer 40, the third inorganic material layer 50, and the fifth inorganic material layer 70, on the premise that the control electrode layer 20 is invisible through the third inorganic material layer 50, the reflectivity of the touch module 000 may be effectively reduced; and the display effect of the display device using the touch module 000 may be significantly improved.

It should be noted that the abscissa x in FIG. 11 represents the wavelength in each wave band of the ambient light. Since the human eyes are more sensitive to light in the wavelength range of 500 nm-600 nm, the anti-reflectivity effect in such band range may be particularly obvious.

In one embodiment, referring to FIGS. 10-11, the reflectivity of the touch module 000 provided in the present disclosure may be in a range of approximately 0%-0.1%.

In the present disclosed touch module 000, along the direction Z1 in which the first touch electrode 201 and the second touch electrode 202 of the touch electrode layer 20 direct to the second inorganic material layer 40, the refractive index of each film layer of the touch module 000 may gradually decrease, and along the direction Z2 in which the first touch electrode 201 and the second touch electrode 202 of the touch electrode layer 20 direct to the substrate 10, the refractive index of each film layer of the touch module 000 may also gradually decrease. The thickness of the first inorganic material layer 30 may be in a range of approximately 2576 angstroms-3024 angstroms. The thickness of the second inorganic material layer 40 may be in a range of approximately 489 angstroms-591 angstroms. The thickness of the fifth inorganic material layer 70 may be in a range of approximately 1380 angstroms-1620 angstroms. The thickness of the third inorganic material layer 50 may be in a range of approximately 452 angstroms-548 angstroms. In one embodiment, the thickness of the first touch electrode 201 and the second touch electrode 202 of the touch electrode layer 20 may be in a range of approximately 425 angstroms-575 angstroms. The thickness of the film layer where the second connection part 602 is located may be greater than or equal to 425 angstroms. By adjustment and matching the thickness of each film layer of the touch module 000, under the premise that the touch layer 20 is invisible through the third inorganic material layer 50, the reflectivity of the touch module 000 is effectively reduced. The display effect of the display device using the touch module 000 may be obviously improved. The matching effect of the optical performance of such an embodiment may be as desired; and the overall reflectivity of the touch module 000 may be in a range of approximately 0%-0.1%, which may approach 0%, or even may be reduced to 0%. Such a reflectivity may fully meet the stringent low anti-reflectivity requirements.

Figure 12:
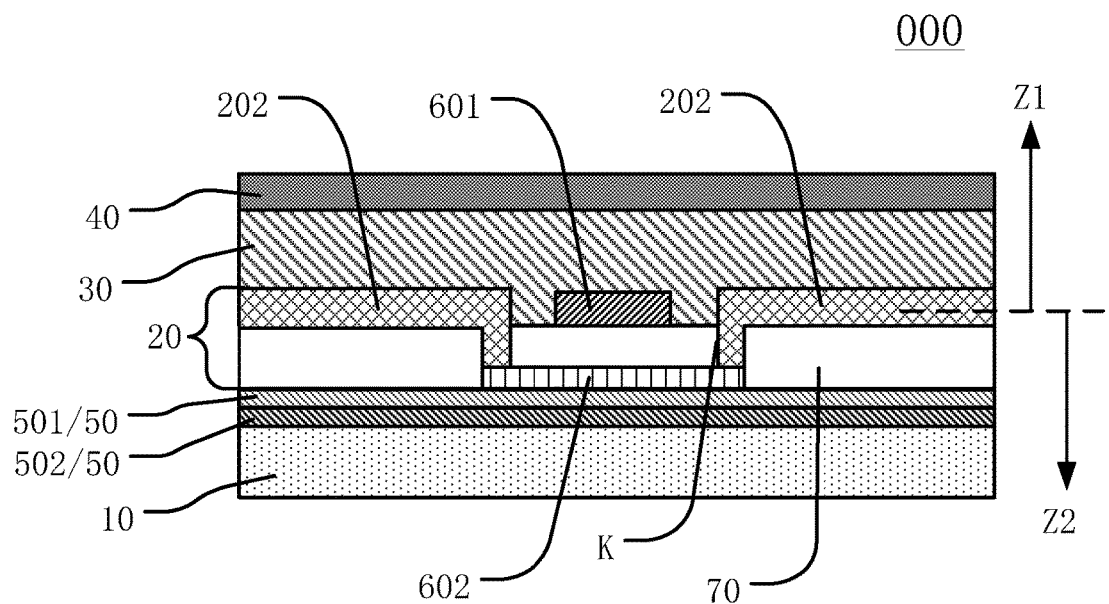
FIG. 12 illustrates a cross-sectional view of a portion of another exemplary display panel consistent with various disclosed embodiments of the present disclosure.

FIG. 12 illustrates a cross-sectional view of a portion of another exemplary touch module consistent with various disclosed embodiments of the present disclosure. As shown in FIG. 12, in one embodiment, the third inorganic material layer 50 may include a first sub-layer 501 and a second sub-layer 502 bonded to each other. Along a direction perpendicular to the substrate 10, the first sub-layer 501 may be disposed on the side of the second sub-layer 502 adjacent to the touch electrode layer 20. The refractive index of the first sub-layer 501 may be smaller than the refractive index of the second sub-layer 502, and the refractive index of the first sub-layer 501 may be smaller than the refractive index of the touch electrode layer 20. In one embodiment, in the process of forming the first sub-layer 501 and the second sub-layer 502 bonded to each other in the third inorganic material layer 50, the second sub-layer 502 may be deposited on the side of the substrate 10 adjacent to the touch electrode layer 20 firstly, then the first sub-layer 501 may be deposited to complete the fabrication of the third inorganic material layer 50.

In such an embodiment, the third inorganic material layer 50 disposed on the side of the touch electrode layer 20 adjacent to the substrate 10 may include two sub-layers: the first sub-layer 501 and the second sub-layer 502, respectively. The first sub-layer 501 may be disposed on the side of the second sub-layer 502 adjacent to the touch electrode layer 20. By setting the refractive index of the first sub-layer 501 to be smaller than that of the touch electrode layer 20 and the refractive index of the first sub-layer 501 to be smaller than the refractive index of the second sub-layer 502, along the direction Z2 in which the first touch electrode 201 and the second touch electrode 202 of the touch electrode layer 20 direct to the substrate 10, the refractive index of each film layer of the touch module 000 may gradually decrease. Further the refractive index of the first sub-layer 501 and the refractive index of the second sub-layer 502 may be both smaller than the refractive index of the touch electrode layer 20. Thus, the refractive index of the third inorganic material layer 50 combined from the first sub-layer 501 and the second sub-layer 502 may also be smaller than the refractive index of the touch electrode layer 20. Thus, the effect of reducing the reflectivity of the touch module may be better achieved; and at the same time, the effect of eliminating shadow may be realized.

In one embodiment, in the touch electrode layer 20, the first touch electrode 201 and the second touch electrode 202 may be made of indium tin oxide (ITO) transparent conductive film with a refractive index of approximately 1.817. The material of the fifth inorganic material layer 70 may be any one of $SiN_x$ and $SiON_x$. The refractive index of $SiN_x$ is approximately 1.814. Therefore, the material of the first sub-layer 501 may be designed to be $SiO_2$, and the refractive index of $SiO_2$ is approximately 1.46. The material of the second sub-layer 502 may be SiN$_x$, and the refractive index of SiN$_x$ is approximately 1.814. The refractive index of the entire third inorganic material layer 50 combined from the two sub-layers may be approximately 1.65. Thus, along the direction Z2 in which the first touch electrode 201 and the second touch electrode 202 of the touch electrode layer 20 direct to the substrate 10 and on the side of the first touch electrode 201 and the second touch electrode 202, the refractive indexes may have an arrange of high refractive index (the refractive index of the fifth inorganic material layer 70 is approximately 1.814)-low refractive index (the refractive index of the first sub-layer 501 is approximately 1.46)-high refractive index (the refractive index of the second sub-layer 502 is approximately 1.814). Such an arrangement may optimize the shadow eliminating effect of the third inorganic material layer 50. At the same time, the requirement that the refractive index of the entire third inorganic material layer 50 may be smaller than the refractive index of the touch electrode layer 20 may be met, and the effect of reducing the reflectivity may be improved.

In one embodiment, along the direction perpendicular to the substrate 10, the thickness of the first sub-layer 501 may be in a range of approximately 227 angstroms-273 angstroms, and the thickness of the second sub-layer 502 may be in a range of approximately 225 angstroms-275 Angstroms. Thus, the thickness of the entire third inorganic material layer 50 combined from the two sub-layers may be in a range of approximately 452 angstroms-548 angstroms. By precisely matching of the thicknesses of the sub-layers, the required optical performance of reducing the reflectivity of the touch module may be met. Accordingly, on the premise that the touch electrode layer 20 may be invisible through the third inorganic material layer 50, the reflectivity of the touch module may be effectively reduced, and the display effect of the display device using the touch module 000 may be improved.

Figure 13:
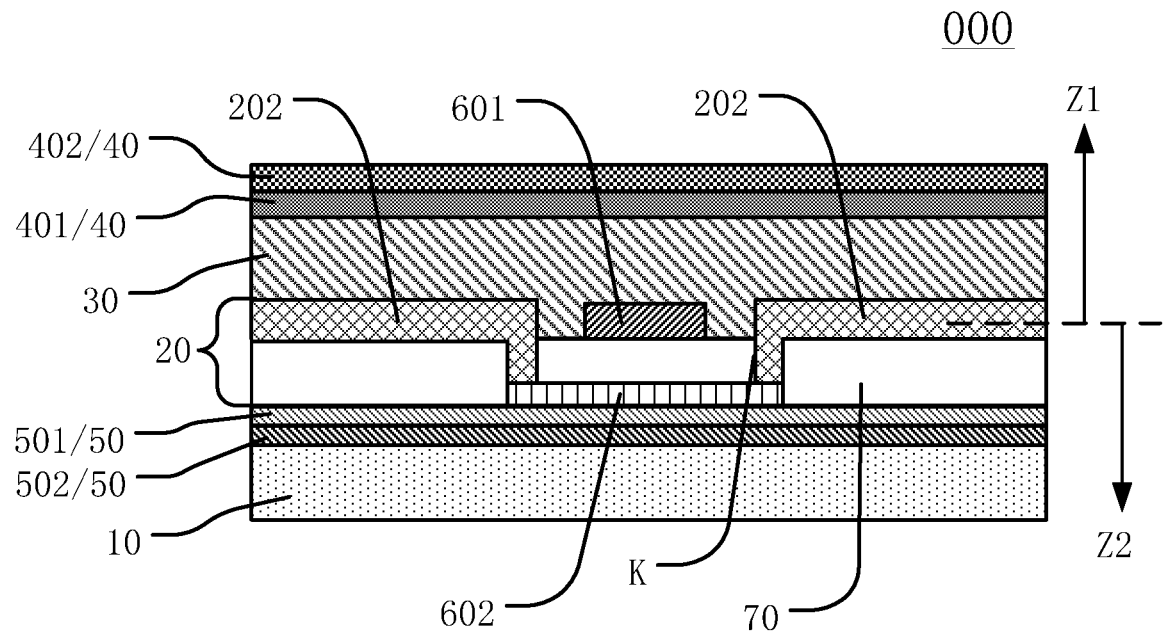
FIG. 13 illustrates a cross-sectional view of a portion of another exemplary display panel consistent with various disclosed embodiments of the present disclosure.

FIG. 13 illustrates a cross-sectional view of a portion of another exemplary touch module consistent with various disclosed embodiments of the present disclosure. As shown in FIG. 13, in one embodiment, the second inorganic material layer 40 may include a third sub-layer 401 and a fourth sub-layer 402 bonded to each other. Along the direction perpendicular to the substrate 10, the third sub-layer 401 may be disposed on the side of the fourth sub-layer 402 adjacent to the touch electrode layer 20. The refractive index of the third sub-layer 401 may be smaller than the refractive index of the fourth sub-layer 402, and the refractive index of the third sub-layer 401 may be smaller than the refractive index of the first inorganic material layer 30. In one embodiment, in the process of forming the third sub-layer 401 and the fourth sub-layer 402 bonded to each other in the second inorganic material layer 40, the third sub-layer 401 may be deposited on the side of the first inorganic material layer 30 away from the touch electrode layer 20, and then the fourth sub-layer 402 may be deposited to complete the formation of the second inorganic material layer 40.

In such an embodiment, the second inorganic material layer 40 disposed on the side of the touch electrode layer 20 away from the substrate 10 may also include two sub-layers, which may be the third sub-layer 401 and the fourth sub-layer 402, respectively. The third sub-layer 401 may be disposed on the side of the fourth sub-layer 402 adjacent to the touch electrode layer 20. By setting the refractive index of the third sub-layer 401 to be smaller than the refractive index of the first inorganic material layer 30, and the refractive index of the third sub-layer 401 to be smaller than the refractive index of the fourth sub-layer 402, along the direction Z1 in which the first touch electrode 201 and the second touch electrode 202 of the touch electrode layer 20 direct to the second inorganic material layer 40, the refractive index of each film layer of the touch module 000 may also gradually decrease, and the refractive index of the third sub-layer 401 and the refractive index of the fourth sub-layer 402 may be both smaller than the refractive index of the touch electrode layer 20. Thus the overall refractive index of the second inorganic material layer 40 combined from the two sub-layers may also be smaller than the refractive index of the touch electrode layer 20, and the effect of reducing the reflectivity of the touch module may be better achieved.

In one embodiment, in the touch electrode layer 20, the first touch electrode 201 and the second touch electrode 202 may be indium tin oxide (ITO) transparent conductive films with a refractive index of approximately 1.817. The material of the first inorganic material layer 30 may be any one of SiN$_x$ and SiON$_x$. The refractive index of SiN$_x$ is approximately 1.814. Therefore, the material of the third sub-layer 401 may be designed as SiO$_2$, and the refractive index of SiO$_2$ is approximately 1.46. The material of the fourth sub-layer 402 may be SiN$_x$, and the refractive index of SiN$_x$ is approximately 1.814. The refractive index of the entire second inorganic material layer 40 combined from the two sub-layers may be approximately 1.65. Thus, along the direction Z1 in which the first touch electrode 201 and the second touch electrode 202 of the touch electrode layer 20 direct to the second inorganic material layer 40, and on the side of the first touch electrode 201 and the second touch electrode 202, the refractive indexes of the film layers may also have an arrangement of high refractive index (the refractive index of the first inorganic material layer 30 is approximately 1.814)-low refractive index (the refractive index of the third sub-layer 401 is approximately 1.46)-high refractive index (the refractive index of the fourth sub-layer 402 is approximately 1.814). Such a configuration may optimize the shadow eliminating effect to the touch module. At the same time, the requirement that the refractive index of the entire second inorganic material layer 40 may be smaller than the refractive index of the touch electrode layer 20 may be met, and the effect of reducing the reflectivity of the touch module may be improved.

In one embodiment, the materials of the second inorganic material layer 40 and the third inorganic material layer 50 may be same, and may both have the structure including two sub-layers. Thus, no matter along the direction Z1 in which the first touch electrode 201 and the first touch electrode 201 of the touch electrode layer 20 direct to the second inorganic material layer 40, or along the direction Z2 in which the first touch electrode 201 and the second touch electrode 202 of the touch electrode layer 20 direct to the substrate 10, on the side of the first touch electrode 201 and the second touch electrode 202, the arrangement of the refractive indexes of the film layers may both high refractive index-low refractive index-high refractive index. The shadow elimination effect of the touch module 000 may be optimized, and the requirement that the refractive indexes of the two combined film layers on both sides the touch electrode layer 20 (without considering the sub-layer) may gradually decrease may be met. Thus, the effect of reducing the reflectivity of the touch module may be improved.

In one embodiment, along the direction perpendicular to the substrate 10, the thickness of the third sub-layer 401 may be in a range of approximately 291 angstroms-349 angstroms, and the thickness of the fourth sub-layer 402 may be in a range of approximately 198 angstroms-242 angstroms. Thus, the thickness of the second inorganic material layer 40 combined from the two sub-layers may be in a range of approximately 489 angstroms-591 angstroms. By accurately matching of the thicknesses of the sub-layers, the required optical performance of the touch module may be met, and on the premise the touch electrode layer 20 may be invisible through the third inorganic material layer 50, the reflectivity of the touch module may be effectively reduced, and the display effect of the display device using the touch module may be improved.

Figure 14:
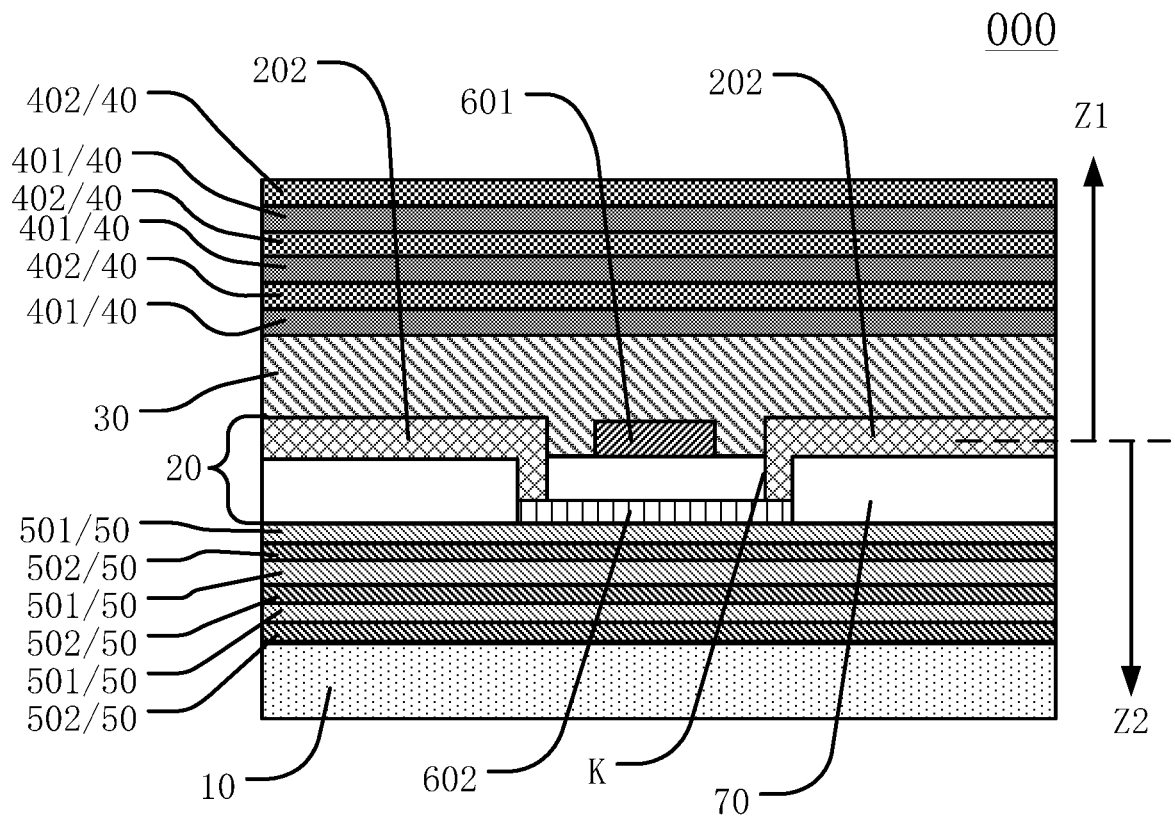
FIG. 14 illustrates a cross-sectional view of a portion of another exemplary display panel consistent with various disclosed embodiments of the present disclosure.

FIG. 14 illustrates a cross-sectional view of a portion of another exemplary touch module consistent with various disclosed embodiments of the present disclosure. As shown in FIG. 14, in one embodiment, a plurality of stacked second inorganic material layers 40 may be disposed on the side of the first inorganic material layer 30 away from the touch electrode layer 20, and a plurality of stacked third inorganic material layers 50 may be disposed the side of the touch electrode layer 20 adjacent to the substrate 10, (for illustrative purposes, FIG. 14 illustrates three stacked second inorganic material layers 40 and three stacked third inorganic material layers 50. In specific implementations, more layers may be included). The number of the second inorganic material layers 40 and the number of the third inorganic material layers 50 may be same.

In such an embodiment, along the direction Z1 in which the first touch electrode 201 and the second touch electrode 202 of the touch electrode layer 20 direct to the second inorganic material layer 40 and along the direction Z2 in which the first touch electrode 201 and the second touch electrode 202 of the touch electrode layer 20 direct to the substrate 10, the plurality of stacked second inorganic material layers 40 on the side of the first touch electrode 201 and the second touch electrode 202, and the plurality of stacked third inorganic material layers 50 may be disposed on the other side of the first touch electrode 201 and the second touch electrode 202. Further, the number of the second inorganic material layers 40 and the third inorganic material layers 50 may be same. The second inorganic material layer 40 may include a third sub-layer 401 and a fourth sub-layer 402 attached to each other. Along the direction perpendicular to the substrate 10, the third sub-layer 401 may be disposed the side of the fourth sub-layer 402 adjacent to the touch electrode layer 20. The refractive index of the third sub-layer 401 may be smaller than that of the fourth sub-layer 402, and the refractive index of the third sub-layer 401 may be smaller than that of the first inorganic material layer 30. The third inorganic material layer 50 may include a first sub-layer 501 and a second sub-layer 502 attached to each other. The first sub-layer 501 may be disposed on the side of the second sub-layer 502 adjacent to the touch electrode layer 20 along the direction perpendicular to the substrate 10. The refractive index of the first sub-layer 501 may be smaller than the refractive index of the second sub-layer 502. The refractive index of the first sub-layer 501 may be smaller than the refractive index of the touch electrode layer 20. Therefore, the inorganic layers on both sides of the first touch electrode 201 and the second touch electrode 202 of the touch electrode layer 20 may be a symmetrical structure with the same material. In particular, along the direction Z1 in which the first touch electrode 201 and the second touch electrode 202 of touch electrode layer 20 direct to the second inorganic material layer 40, on the sides of the first touch electrode 201 and the second touch electrode 202, the refractive indexes of the film layer may have an order of high refractive index (the refractive index of the first inorganic material layer 30 is approximately 1.814)-low refractive index (the refractive index of the third sub-layer 401 is approximately 1.46)-high refractive index (the refractive index of the fourth sub-layer 402 is approximately 1.814)-low refractive index (the refractive index of the third sub-layer 401 is approximately 1.46)-high refractive index (the refractive index of the fourth sub-layer 402 is approximately 1.814)-low refractive index (the refractive index of the third sub-layer 401 is approximately 1.46)-high refractive index (the refractive index of the fourth sub-layer 402 is approximately 1.814). Further, along the direction Z2 in which the first touch electrode 201 and the second touch electrode 202 of the touch electrode layer 20 direct to the substrate 10, and on the other sides of the first touch electrode 201 and the second touch electrode 202, the refractive indexes of the film layers may have an order of high refractive index (the refractive index of the fifth inorganic material layer 70 is approximately 1.814)-low refractive index (the refractive index of the first sub-layer 501 is approximately 1.46)-high refractive index (the refractive index of the second sub-layer 502 is approximately 1.814)-low refractive index (the refractive index of the first sub-layer 501 is approximately 1.46)-high refractive index (the refractive index of the second sub-layer 502 is approximately 1.814)-low refractive index (the refractive index of the first sub-layer 501 is approximately 1.46)-high refractive index (the refractive index of the second sub-layer 502 is approximately 1.814). Under such a configuration, the shadow elimination effect of the touch module may be further optimized; and the effect of reducing the reflectivity may be further improved.

Figure 15:
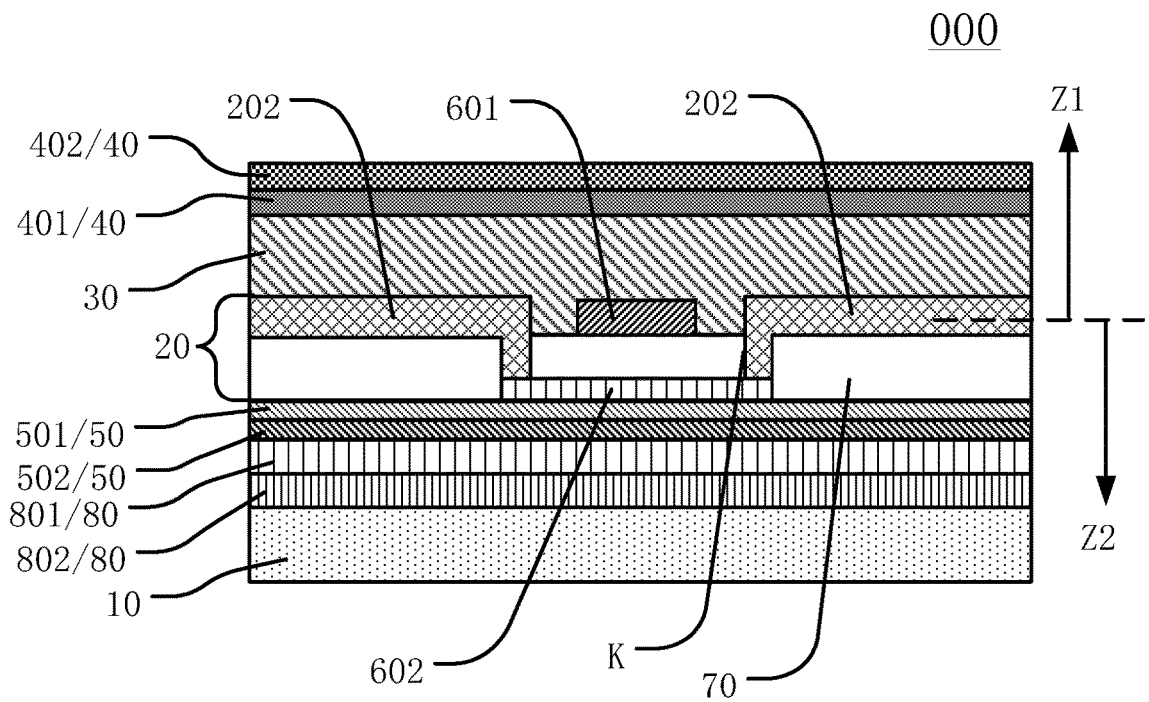
FIG. 15 illustrates a cross-sectional view of a portion of another exemplary display panel consistent with various disclosed embodiments of the present disclosure.

FIG. 15 illustrates a cross-sectional view of a portion of another exemplary touch module consistent with various disclosed embodiments of the present disclosure. As shown in FIG. 15, in one embodiment, at least one fourth inorganic material layer 80 may be disposed between the third inorganic material layer 50 and the substrate 10. The fourth inorganic material layer 80 may include a fifth sub-layer 801 and a sixth sub-layer 802 attached to each other. Along the direction perpendicular to the substrate 10, the fifth sub-layer 801 may be disposed on the side of the sixth sub-layer 802 adjacent to the third inorganic material layer 50. The refractive index of the fifth sub-layer 801 may be greater than the refractive index of the third inorganic material layer 50, and the refractive index of the sixth sub-layer 802 may be smaller than the refractive index of the third inorganic material layer 50. The refractive index of the sixth sub-layer 802 may be greater than the refractive index of the substrate 10. In one embodiment, when forming the fifth sub-layer 801 and the sixth sub-layer 802 bonded to each other in the fourth inorganic material layer 80, the six sub-layers 802 may be formed on the side of the substrate 10 adjacent to the touch electrode layer 20 firstly, and then the fifth sub-layer 801 may be deposited to complete the formation of the fourth inorganic material layer 80.

In such an embodiment, at least one fourth inorganic material layer 80 may be disposed between the third inorganic material layer 50 and the substrate 10, and the fourth inorganic material layer 80 may include the fifth sub-layer 801 and the six sub-layer 802. The fifth sub-layer 801 may be disposed on the side of the sixth sub-layer 802 adjacent to the third inorganic material layer 50. The refractive index of the fifth sub-layer 801 may be greater than the refractive index of the third inorganic material layer 50. In particular, the refractive index of the layer adjacent to the inorganic material layer 50 may be smaller than the refractive index of the fifth sub-layer 801. Such a configuration may satisfy that along the direction Z2 in which the first touch electrode 201 and the second touch electrode 202 of the touch electrode layer 20 direct to the substrate 10, from the first touch electrode 201 and the second touch electrode 202 to the third inorganic material layer 50, the refractive indexes of the film layers may gradually decrease. But the refractive index of the fifth sub-layer 801 of the fourth inorganic material layer 80 may become to be greater than the refractive index of the third inorganic material layer 50, and the refractive index of the sixth sub-layer 802 may be smaller than the refractive index of the third inorganic material layer 50. In particular, the refractive indexes of the film layers on the side of the third inorganic material layer 50 adjacent to the substrate 10 may not continually decrease. The refractive index may be first greater than the refractive index of the third inorganic material layer 50, and then may be reduced to be smaller than the refractive index of the third inorganic material layer 50. By using this roundabout way of sequentially reducing the refractive index, along the direction Z2 in which the first touch electrode 201 and the second touch electrode 202 of the touch electrode layer 20 direct to the substrate 10, and the refractive index of the overall film layer may still tend to gradually decrease. However, in any case, the refractive index of the sixth sub-layer 802 adjacent to the substrate 10 may still needs to be greater than the refractive index of the substrate 10. Thus, the effect of eliminating the shadow of the electrode block patterns of the touch electrode layer 20 may be further improved, and the effect of the electrode block patterns of the touch electrode layer 20 on the reflectivity of the entire touch module may be effectively reduced to be the minimum.

In one embodiment, the material of the fifth sub-layer 801 may include any one of the high-refractive-index thin film materials, such as silicon nitride ($SiN_x$), titanium dioxide ($TiO_2$), and niobium pentoxide ($Nb_2O_5$), and the material of the sixth sub-layer 802 may be low-refractive-index material, such as silicon dioxide ($SiO_2$).

In the touch electrode layer 20, the first touch electrode 201 and the second touch electrode 202 may be made of indium tin oxide (ITO) with a refractive index of approximately 1.817; the fifth inorganic material layer 70 may be made of any one of $SiN_x$ and $SiON_x$. The refractive index of $SiN_x$ is approximately 1.814. Therefore, the material of the first sub-layer 501 may be designed as $SiO_2$; and the refractive index of $SiO_2$ is approximately 1.46. The material of the second sub-layer 502 may be $SiN_x$; and the refractive index of $SiN_x$ is approximately 1.814. Accordingly, the refractive index of the overall third inorganic material layer 50 combined from the two sub-layers is approximately 1.65. The material of the fifth sub-layer 801 may include a high-refractive-index thin film made of any of silicon nitride ($SiN_x$), titanium dioxide ($TiO_2$), and niobium pentoxide ($Nb_2O_5$), etc.; and the refractive index of such material may be greater than the refractive index of the third inorganic material layer 50 (approximately 1.65). Thus, the refractive index of the fifth sub-layer 801 may be greater than the refractive index of the third inorganic material layer 50. The material of the sixth sub-layer 802 may include low-refractive-index silicon dioxide ($SiO_2$). The refractive index of $SiO_2$ may be approximately 1.46. Such a refractive index may cause the refractive index of the sixth sub-layer 802 to be between the refractive index of the third inorganic material layer 50 and the refractive index of the substrate 10. Accordingly, along the direction Z2 in which the first touch electrode 201 and the second touch electrode 202 of the touch electrode layer 20 direct to the substrate 10, the overall change trend of the refractive indexes of the film layers may still be gradual decreasing. Thus, the shadow elimination effect on the electrode block patterns of the touch electrode layer 20 may be further improved, and the effect of the electrode block patterns of the touch electrode layer 20 on the reflectivity of the entire module may be effectively minimized.

Figure 16:
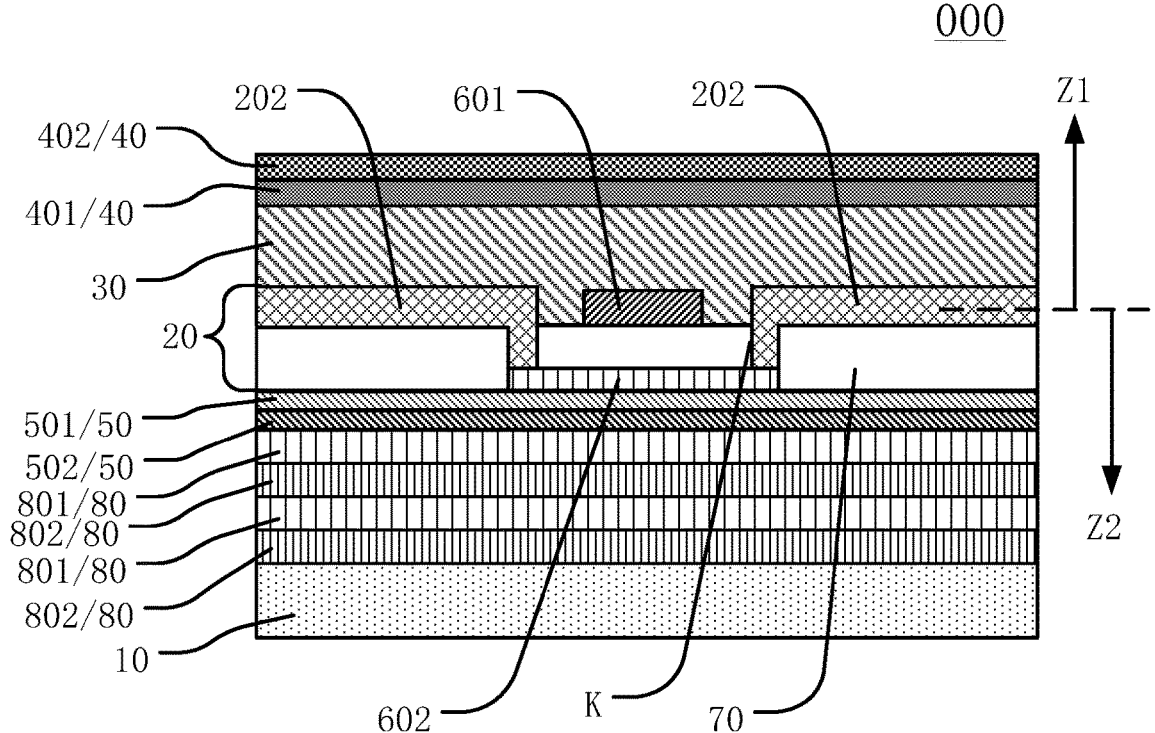
FIG. 16 illustrates a cross-sectional view of a portion of another exemplary display panel consistent with various disclosed embodiments of the present disclosure.

FIG. 16 illustrates a cross-sectional view of a portion of another exemplary touch module consistent with various disclosed embodiments of the present disclosure. As shown in FIG. 16, in one embodiment, two stacked fourth inorganic material layers 80 may be disposed between a third inorganic material layer 50 and the substrate 10. Each fourth inorganic material layer 80 may include a fifth sub-layer 801 and a sixth sub-layer 802 attached to each other. Along the direction perpendicular to the substrate 10, the fifth sub-layer 801 in the fourth inorganic material layer 80 may be disposed on the side of the sixth sub layer 802 adjacent to the third inorganic material layer 50. The refractive index of the fifth sub-layer 801 may be greater than the refractive index of the third inorganic material layer 50. The refractive index of the sixth sub-layer 802 may be smaller than the refractive index of the third inorganic material layer 50, and the refractive index of the sixth sub-layer 802 may be greater than the refractive index of the substrate 10. In such an embodiment, the fourth inorganic material layer 80 may also have a multi-layer structure so as to further improve the effects of reducing reflectivity and eliminating shadows.

Figure 17:
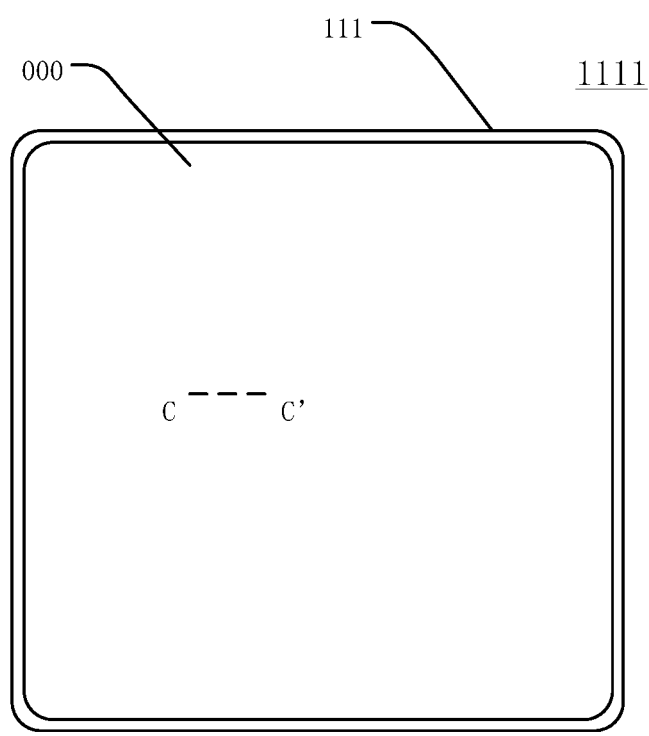
FIG. 17 illustrates a planar view of an exemplary touch display panel consistent with various disclosed embodiments of the present disclosure.

The present disclosure also provides a touch display panel. FIG. 17 illustrates an exemplary display panel consistent with various disclosed embodiments of the present disclosure.

As shown in FIG. 17, the touch display panel 1111 may include a display module 111 and a touch module 000. The touch module 000 may be the touch module described in the above embodiments of the present disclosure, or other appropriate touch module. In one embodiment, the display module 111 may be an organic light emitting display panel (OLED), a liquid crystal display panel (LCD), or a micro-LED display panel. The structure of the display module 111 is not described in the present disclosure. The details may be referred to the structure of the organic light-emitting display panel and the micro-LED display panel in the related art.

For illustrative purposes, FIG. 17 only uses a mobile phone as an example to describe the touch display panel 1111. It can be understood that the touch display panel 1111 provided by the present disclosure may be a computer, a TV, a car display device, or other device having the display functions; and the touch display panel 1111 is not specifically limited in the present disclosure. The touch display panel 1111 provided by the present disclosure may have at least the beneficial effects of the touch module 000 provided by the present disclosure. For details, reference may be made to the specific description of the touch module 000 in the foregoing embodiments.

Figure 18:
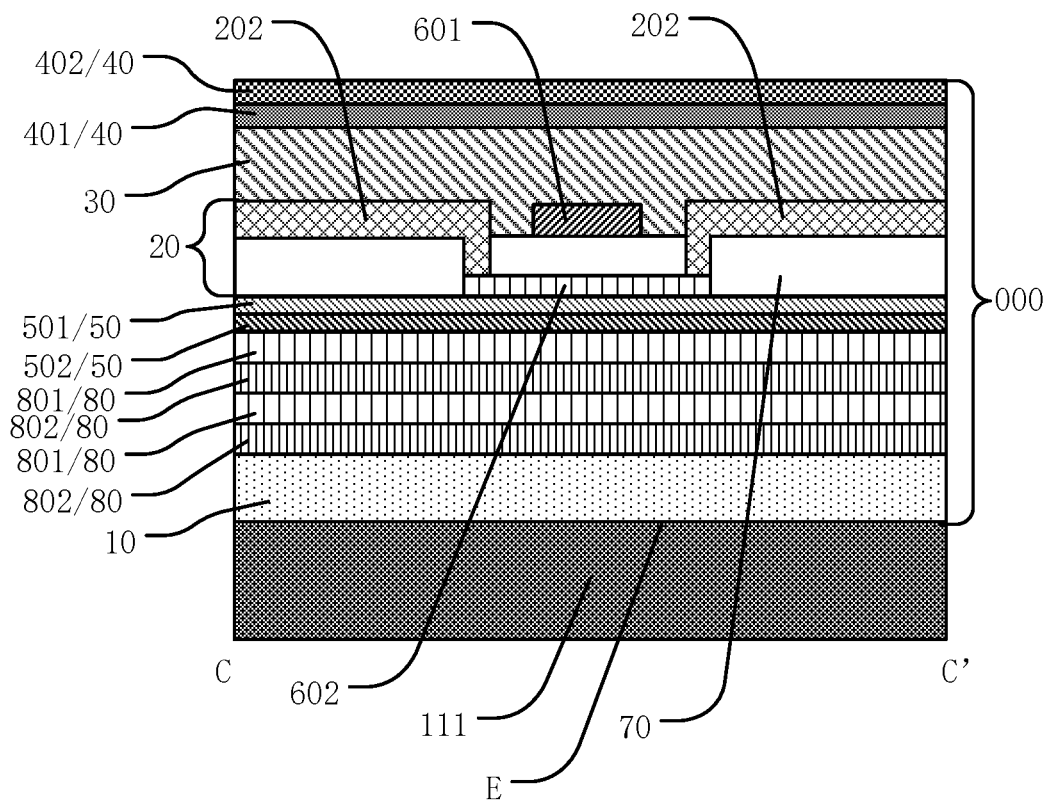
FIG. 18 illustrates a C-C'-sectional view in FIG. 17 consistent with various disclosed embodiments of the present disclosure.

FIG. 18 illustrates an exemplary C-C'-sectional view in FIG. 17. As shown in FIGS. 17-18, in one embodiment, the touch module 000 may be disposed on the side of the light-emitting surface E of the display module 111 E.

In such an embodiment, the touch module 000 may be disposed on the side of the light-emitting surface E of the display module 111. In particular, the touch module 000 may be an out-cell design, and the touch module 000 may be directly attached to the side of the light-emitting surface E of the packaged display module 111. Accordingly, the difficulty of the fabrication process may be reduced.

Figure 19:
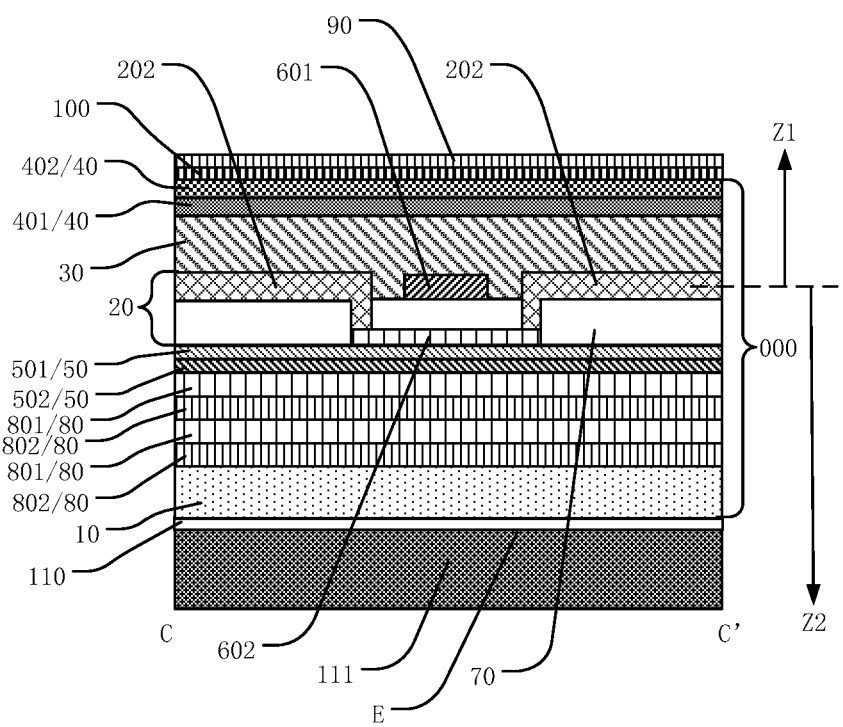
FIG. 19 illustrates another C-C'-sectional view in FIG. 17 consistent with various disclosed embodiments of the present disclosure.

FIG. 19 illustrates another exemplary C-C'-sectional view in FIG. 17. As shown in FIG. 17 and FIG. 19, in one embodiment, the touch module 000 may be an out-cell design. The touch display panel 1111 may further include a protective cover plate 90 disposed on the side of the touch module 000 away from the display module 111. The side of the touch module 000 may be bonded to the protective cover plate 90 through a first optical adhesive layer 100. The other side of the touch module 000 may be attached to the display module 111 through a second optical adhesive layer 110 (not filled in the figure).

The refractive index of the second inorganic material layer 40 may be greater than the refractive index of the first optical adhesive layer 100, and the refractive index of the third inorganic material layer 50 may be greater than the refractive index of the second optical adhesive layer 110.

In such an embodiment, the touch display panel 1111 may further include a protective cover plate 90 disposed on the side of the touch module 000 away from the display module 111 to protect the entire touch display panel 000. The touch module 000 and the protective cover 90 may be attached and fixed to each other by the first optical adhesive layer 100, and the other side of the touch module 000 and the display module 111 may be attached to each other by the second optical adhesive layer 110. In one embodiment, the first optical adhesive layer 100 and the second optical adhesive layer 110 may be made of a same material, which may be beneficial to simplify the process and reduce the difficulty of the fabrication process. The optical adhesive may be colorless and transparent; and its light transmittance may be above 90%; and the bonding strength may be as desired. Further, the optical adhesive may be cured at room temperature or intermediate temperature, and it has the characteristics of small curing shrinkage. The optical adhesive may be organic silicone, acrylic resin and unsaturated polyester, epoxy resin, or polyurethane, etc., and may be used to bond optical components. When mixing the optical adhesive, some processing agents may be usually added during formulation to improve their optical properties and/or reduce curing shrinkage. In one embodiment, the refractive index of the second inorganic material layer 40 may be greater than the refractive index of the first optical adhesive layer 100, and the refractive index of the third inorganic material layer 50 may be greater than the refractive index of the second optical adhesive layer 110. The overall refractive index of the touch module 000 may be adjusted to be close to that of the first optical adhesive layer 100 and the second optical adhesive layer 110 so as to achieve the effect of reducing the reflectivity. In such a configuration, whether along the direction Z1 in which the first touch electrode 201 and the second touch electrode 202 of the touch electrode layer 20 direct to the protective cover plate 90 or along the direction Z2 in which the first touch electrode 201 and the second touch electrode 202 of the touch electrode layer 20 direct to the light-emitting surface E of the display module 111, on the side of the first touch electrode 201 and the second touch electrode 202, the overall refractive index of each film layer may gradually decrease. By accurately matching the film thicknesses and the refractive indexes of the film layers of the touch module to meet the required optical performance of the touch module, under the premise that the patterns of the touch electrode layer 20 may be invisible, the reflectivity of the touch module may be effectively reduced and the display effect of the touch display panel 1111 may be improved.

In some embodiments, referring to FIGS. 17 and 19, the overall refractive index of the touch module 000 may be referred to as "A", the refractive index of the first optical adhesive layer 100 and the refractive index of the second optical adhesive layer 110 may be referred to as "B", and A−B≤0.8.

By matching the thickness and the refractive index of each film layer of the touch module 000, the overall refractive index of the touch module 000 may approach the refractive index of the first optical adhesive layer 100 (and the refractive index of the second optical adhesive layer 110); the effect of reducing the reflectivity may be improved. Further, in one embodiment, by matching the thickness and the refractive index of each film layer of the touch module 000, the overall refractive index of the touch module 000 may be referred to as "A", the refractive index of the first optical adhesive layer 100 and the refractive index of the second optical adhesive layer 110 may be referred to as "B", and A−B≤0.8. In particular, the difference between the overall refractive index of the touch module 000 and the refractive index of the first optical adhesive layer 100 (and the refractive index of the second optical adhesive layer 110) may be less than or equal to approximately 0.8, or A and B may be equal. Such a configuration may further reduce the reflectivity of the touch display panel; and the display quality may be enhanced. In one embodiment, a plurality of tests are performed; and by match the thickness and the refractive index of each film layer of the touch module 000, the refractive index of the protective cover plate 90 may be determined as approximately 1.5 (generally a cover plate made of glass material), and the refractive index of the optical adhesive is approximately 1.42. According to theoretical calculation and simulation data, when the overall refractive index of each film layer of the touch module 000 is controlled within a range of approximately 1.42-1.5, the requirement for reducing the reflectivity may be met.

Figure 20:
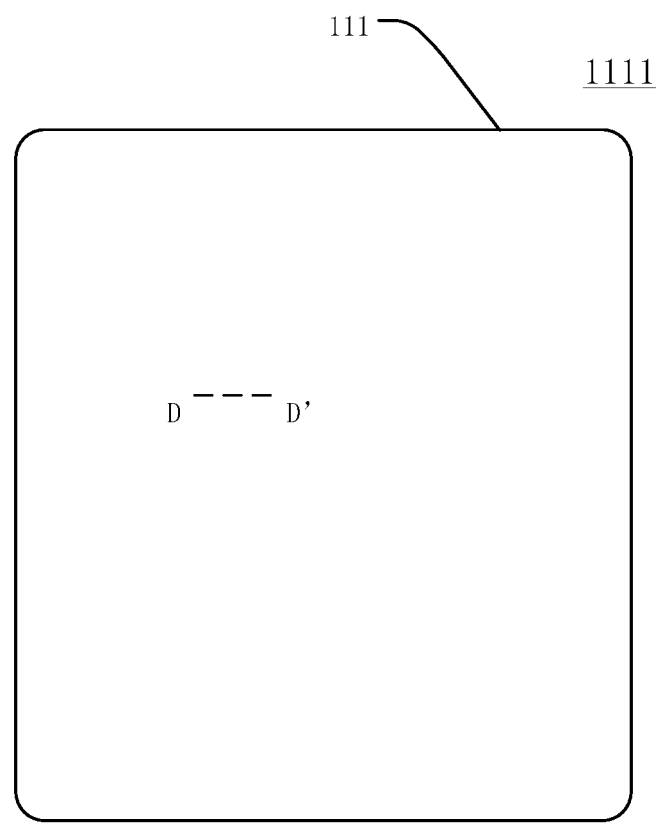
FIG. 20 illustrates a planar view of another exemplary touch display panel consistent with various disclosed embodiments of the present disclosure.
Figure 21:
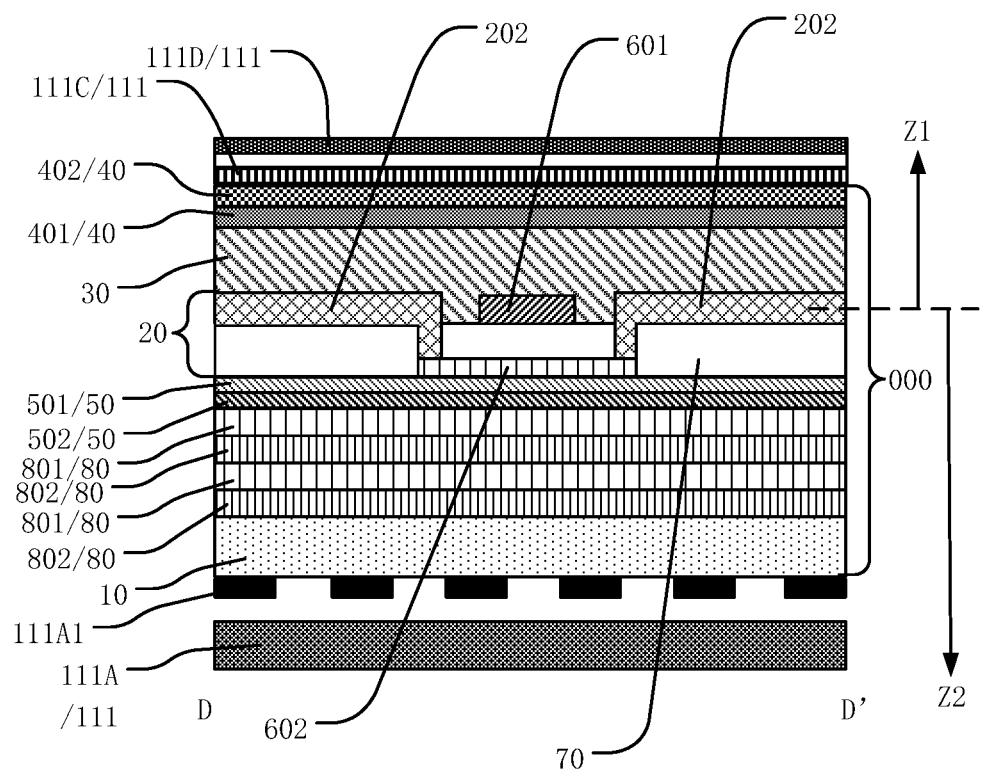
FIG. 21 illustrates a D-D'-sectional view in FIG. 20 consistent with various disclosed embodiments of the present disclosure.
Figure 22:
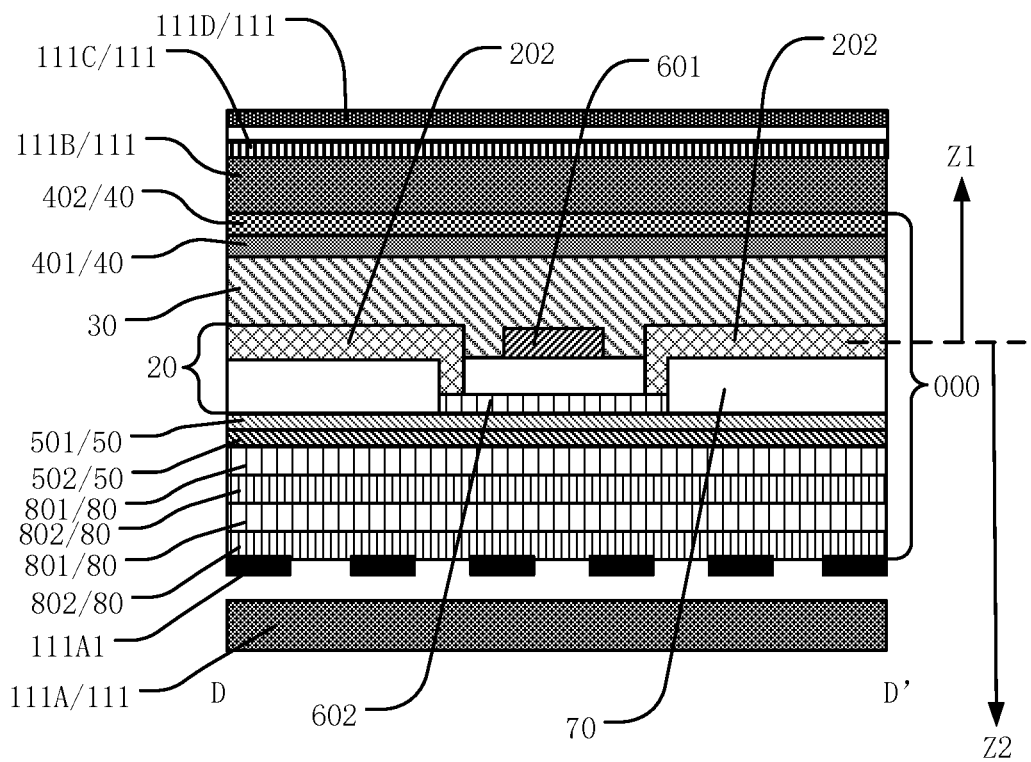
FIG. 22 illustrates another D-D'-sectional view in FIG. 20 consistent with various disclosed embodiments of the present disclosure.
Figure 23:
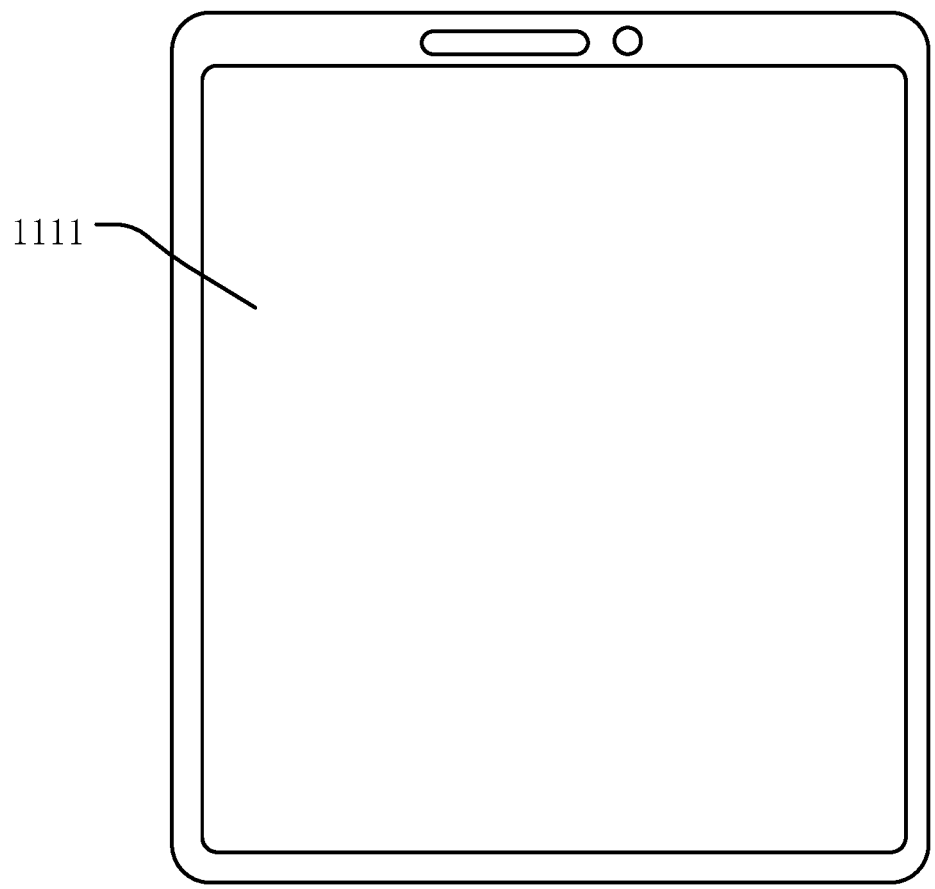
FIG. 23 illustrates an exemplary display device consistent with various disclosed embodiments of the present disclosure.

FIG. 20 illustrates another exemplary touch display panel consistent with various disclosed embodiments of the present disclosure. FIG. 21 is a D-D'-sectional view in FIG. 20. FIG. 22 is another D-D'-sectional view in FIG. 20. As shown in FIG. 20, the touch module 000 may be disposed in the display module 111. In one embodiment, as shown in FIG. 21, the touch module 000 may be an on-cell design. In another embodiment, as shown in FIG. 22, the touch module 000 may be an in-cell design.

In some embodiments, the touch module 000 may be disposed in the display module 111. As shown in FIG. 21, in one embodiment, the touch module 000 may be an on-cell design, and the display module 111 may include an array substrate 111A and an opposing color filter substrate (in this case, the substrate 10 of the touch module 000 may be used as the substrate of the color filter substrate and the substrate of the touch module 000, and the structures such as the black matrix and the color filter layer, etc., of the color filter substrate may be directly formed on the surface of the substrate.). The touch module 000 and the color filter substrate may share the same substrate, and the other film structures of the touch module 000 may be formed on the side of the substrate 10 away from the array substrate 111A. The side of the touch module 000 away from the array substrate 111A may include an upper polarizer 111C, and the side of the upper polarizer 111C away from the touch module 000 may include a protective cover plate 111D. The protective cover 111D and the upper polarizer 111C may be attached and fixed by an optical glue (not filled in the figure). The side of the substrate 10 of the touch module 000 (i.e., the substrate of the color filter substrate) adjacent to the array substrate 111A may include a black matrix 111 A1.

In another embodiment, as shown in FIG. 22, the touch module 000 may be an in-cell design. The display module 111 may include an array substrate 111A and an opposing color filter substrate 111B. The side of the color filter substrate 111B away from the array substrate 111A may include an upper polarizer 111C. The side of the upper polarizer 111C away from the color filter substrate 111B may include a protective cover plate 111D. The protective cover plate 111D and the upper polarizer 111C may be bonded and fixed by an optical adhesive (not filled in the figure). The side of the substrate 111B adjacent to the array substrate 111A may include a black matrix 111A1. In such a configuration, the touch module 000 may be disposed between the color film substrate 111B and the black matrix 111A1. Accordingly, the substrate 10 of the touch module 000 in FIG. 21 may not be needed, and each film layer of the touch module 000 may be directly formed on the side of the surface of the color filter substrate 111B adjacent to the black matrix 111A1. It should be noted that FIG. 22 merely illustrates the structure of the touch module 000 disposed on the side of the color filter substrate 111B when the touch module 000 is an in-cell design. In some embodiments, the touch module 000 may also be disposed on one side of the array substrate 111A when the touch module 000 is an in-cell design. The relative position of the touch module is not limited in the present disclosure.

In one embodiment, regardless of whether the touch module 000 is an in-cell design or an on-cell design, the touch module 000 may be jointly formed in the fabrication process of the display module 111. Using such a configuration, the fabrication accuracy may be increased, and the touch display panel 1111 may be made thinner and lighter. Further, the touch module 000 may have the technical effects in the above-mentioned embodiments, and will not be repeated in the present embodiment.

It should be noted that other film layers may also be included between the array substrate 111A and the color filter substrate 111B, such as a liquid crystal layer in a liquid crystal display panel, a thin-film transistor layer, or an organic light emitting layer in an organic light-emitting display panel, etc. It may be understood with reference to the structure of each display panel in the related art. FIG. 21 is only a schematic drawing of the film layer structure, and details are not described in the present embodiment.

Further, the present disclosure provides a touch display device. FIG. 22 illustrates a planar view of an exemplary touch display device consistent with various disclosed embodiments of the present disclosure.

As shown in FIG. 22, the touch display device 11111 may include a touch display panel 1111. The touch display panel 1111 may be a previously described touch display panel, or other appropriate display panel. FIG. 22 only uses a mobile phone as an example to describe the touch display device 11111. In some embodiments, the touch display device 11111 provided by the present disclosure may be a computer, a TV, a car display device, or other device having the display function. The touch display device 111111 is not specifically limited in the present invention. The touch display device 11111 provided by the present disclosure may have the beneficial effects of the present disclosed touch display panel. For details, reference may be made to the specific description of the touch display panel 1111 in the previously described embodiments.

It can be known from the foregoing embodiments that the touch module, touch display panel, and touch display device provided by the present disclosure may achieve at least the following beneficial effects.

In the touch module provided by the present disclosure, on the premise that the touch electrode layer may be invisible through the third inorganic material layer, the refractive index of the touch electrode layer may be greater than the refractive index of the first inorganic material layer, the refractive index of the first inorganic material may be greater than the refractive index of the second inorganic material layer; the refractive index of the touch electrode layer may be greater than the refractive index of the third inorganic material layer. Such a configuration may be able to match the optical effect of reducing reflectivity. The matching of the refractive indexes may be achieved by adjusting the thicknesses and compositions of the first inorganic material layer, the second inorganic material layer, the third inorganic material layer. Along the direction in which the touch electrode layer directs to the second inorganic material layer, the refractive index of each film layer of the touch module may gradually decrease, and the refractive index of the second inorganic material layer obtained by adjusting the thickness of the second inorganic material layer may be between the refractive index of the first inorganic material layer and the refractive index of the optical adhesive layer; and the second inorganic layer may become a transition layer. Further, along the direction in which the touch electrode layer directs the substrate, the refractive index of each film layer of the touch module may also gradually decrease, and the refractive index of the third inorganic layer obtained by adjusting the thickness of the third inorganic material layer may be between the refractive index of the touch electrode layer and the refractive index of the substrate, and the third inorganic material may also become a transition layer. When the ambient light is incident on the upper surface of the second inorganic material layer, a portion of the light may be directly reflected on the upper surface of the second inorganic material layer to the human eyes, and a portion of the light may need to be incident on each film layer of the touch module. Because each two film layers of the different materials may have a refractive interface and the touch module may be composed of multiple film layers, the incident light may generate reflected light at the interface of each two film layers. By designing and matching the thickness of each film layer, the vector directions may be superimposed and canceled when the vector light reflected at the interface between different film layers and finally incident into the human eye and interferes with each other; and the optical path difference between the light directly reflected on the upper surface of the second inorganic material layer and the light reflected by each film layer after passing through the film layers, such as the touch electrode layer, etc., may be as consistent as possible so as to minimize the influence of the electrode block patterns of the touch electrode layer on the reflectivity of the entire module. Accordingly the reflectivity of the touch module may be further reduced and the lowest reflection effect may be achieved.

Although some specific embodiments of the present disclosure have been described in detail through examples, those skilled in the art should understand that the above examples are only for illustration, not for limiting the scope of the present disclosure. Those skilled in the art should understand that the above embodiments can be modified without departing from the scope and spirit of the present invention. The scope of the invention is defined by the appended claims.

What is claimed is:

1. A touch module, comprising:
    a substrate;
    at least one touch electrode layer, disposed over a side of the substrate;
    a first inorganic material layer, disposed over a side of the at least one touch electrode layer away from the substrate;

at least one second inorganic material layer, disposed over a side of the first inorganic material layer away from the at least one touch electrode layer; and at least one third inorganic material layer, disposed over a side of the at least one touch electrode layer adjacent to the substrate, wherein:

a refractive index of the at least one touch electrode layer is greater than a refractive index of the first inorganic material layer;

the refractive index of the first inorganic material layer is greater than a refractive index of the at least one second inorganic material layer; and the refractive index of the touch electrode layer is greater than a refractive index of the at least one third inorganic material layer.

2. The touch module according to claim 1, wherein:

the at least one third inorganic material layer includes a first sub-layer and a second sub-layer attached to each other;

along a direction perpendicular to the substrate, the first sub-layer is disposed on a side of the second sub-layer adjacent to the at least one touch electrode layer;

a refractive index of the first sub-layer is smaller than a refractive index of the second sub-layer; and the refractive index of the first sub-layer is smaller than the refractive index of the at least one touch electrode layer.

3. The touch module according to claim 2, wherein:

the first sub-layer is made of $SiO_2$; and the second sub-layer is made of $SiN_x$.

4. The touch module according to claim 3, wherein:

along the direction perpendicular to the substrate, a thickness of the first sub-layer is in a range of approximately 227 angstroms-273 angstroms; and a thickness of the second sub-layer is in a range of approximately 225 angstroms-275 angstroms.

5. The touch module according to claim 2, wherein:

the at least one second inorganic material layer includes a third sub-layer and a fourth sub-layer attached to each other;

along the direction perpendicular to the substrate, the third sub-layer is disposed on a side of the fourth sub-layer adjacent to the at least one touch electrode layer;

a refractive index of the third sub-layer is smaller than a refractive index of the fourth sub-layer; and the refractive index of the third sub-layer is smaller than the refractive index of the first inorganic material layer.

6. The touch module according to claim 5, wherein:

the third sub-layer is made of $SiO_2$; and the fourth sub-layer is made of $SiN_x$.

7. The touch module according to claim 6, wherein:

along the direction perpendicular to the substrate, a thickness of the third sub-layer is in a range of approximately 291 angstroms-349 angstroms; and a thickness of the fourth sub-layer is in a range of approximately 198 angstroms-242 angstroms.

8. The touch module according to claim 1, wherein:

a plurality of stacked second inorganic material layers are disposed over a side of the first inorganic material layer away from the touch electrode layer;

a plurality of stacked third inorganic material layers are disposed over a side of the touch electrode layer adjacent to the substrate; and a number of the plurality of stacked second inorganic material layers is same as a number of the plurality of stacked third inorganic material layers.

9. The touch module according to claim 8, wherein:

the fifth sub-layer is made of one of $SiN_x$, $TiO_2$ and $Nb_2O_5$.

10. The touch module according to claim 1, wherein:

the at least one first inorganic material layer and the at least one second inorganic material layer are made of a same material.

11. The touch module according to claim 1, wherein:

at least one fourth inorganic material layer is disposed between the at least one third inorganic material layer and the substrate;

the at least one fourth inorganic material layer includes a fifth sub-layer and a sixth sub-layer attached to each other;

along the direction perpendicular to the substrate, the fifth sub-layer is disposed on a side of the sixth sub-layer adjacent to the at least one third inorganic material layer;

a refractive index of the fifth sub-layer is greater than the refractive index of the third inorganic material layer;

a refractive index of the sixth sub-layer is smaller than the refractive index of the at least one third inorganic material layer; and the refractive index of the sixth sub-layer is greater than a refractive index of the substrate.

12. The touch module according to claim 1, wherein:

the at least one touch electrode layer includes a plurality of first touch electrodes arranged as a matrix and a plurality of second touch electrodes arranged as a matrix;

two adjacent first touch electrodes of the plurality of first touch electrodes in a same row of the matrix are electrically connected through a first connection part;

two adjacent second touch electrodes of the plurality of second touch electrodes in a same column of the matrix are electrically connected through a second connection part;

the first connection part and the first touch electrodes are disposed in a same layer;

a fifth inorganic material layer is disposed between the second connection part and the first touch electrodes; and two adjacent second touch electrodes of the plurality of second touch electrodes are electrically connected through a connection via in the fifth inorganic material layer.

13. The touch module according to claim 12, wherein:

the first inorganic material layer and the fifth inorganic material layer are made of one of $SiN_x$ and $SiON_x$.

14. The touch module according to claim 12, wherein:

a thickness of the first inorganic material layer is in a range of approximately 2576 angstroms-3024 angstroms;

a thickness of the second inorganic material layer is in a range of approximately 489 angstroms-591 angstroms;

a thickness of the fifth inorganic material layer is in a range of approximately 1380 angstroms-1620 angstroms; and a thickness of the third inorganic material layer is in a range of approximately 452 angstroms-548 angstroms.

15. The touch module according to claim 1, wherein:

an overall reflectivity of the touch module is in a range of approximately 0%-0.1%.

16. A touch display panel, comprising:
a display module; and
a touch module, including:
- a substrate;
- at least one touch electrode layer, disposed over a side of the substrate;
- a first inorganic material layer, disposed over a side of the at least one touch electrode layer away from the substrate;
- at least one second inorganic material layer, disposed over a side of the first inorganic material layer away from the at least one touch electrode layer; and
- at least one third inorganic material layer, disposed over a side of the at least one touch electrode layer adjacent to the substrate, wherein:
- a refractive index of the at least one touch electrode layer is greater than a refractive index of the first inorganic material layer;
- the refractive index of the first inorganic material layer is greater than a refractive index of the at least one second inorganic material layer; and
- the refractive index of the at least one touch electrode layer is greater than a refractive index of the at least one third inorganic material layer.

17. The touch display panel according to claim 16, wherein:
the touch module is disposed over a side of a light-exiting surface of the display module.

18. The touch display panel according to claim 17, further comprising:
a protective cover plate disposed over a side of the touch module away from the display module,
wherein:
- the protective cover plate is attached to the side of the touch module away from the display module through a first optical adhesive layer;
- the display module is attached to another side of the touch module through a second optical adhesive layer;
- the refractive index of the at least one second inorganic material layer is greater than a refractive index of the first optical adhesive layer; and
- the refractive index of the at least one third inorganic material layer is greater than a refractive index of the second optical adhesive layer.

19. The touch display panel according to claim 18, wherein:
- an overall refractive index of the touch module is "A";
- the refractive index of the first optical adhesive layer and the second optical adhesive layer is "B"; and
- $A-B \leq 0.8$.

20. A touch display device, comprising:
a display panel including a display module and a touch module,
wherein the touch module includes:
- a substrate;
- at least one touch electrode layer, disposed over a side of the substrate;
- a first inorganic material layer, disposed over a side of the at least one touch electrode layer away from the substrate;
- at least one second inorganic material layer, disposed over a side of the first inorganic material layer away from the at least one touch electrode layer; and
- at least one third inorganic material layer, disposed over a side of the touch electrode layer adjacent to the substrate, wherein:
- a refractive index of the at least one touch electrode layer is greater than a refractive index of the first inorganic material layer;
- the refractive index of the first inorganic material layer is greater than a refractive index of the at least one second inorganic material layer; and
- the refractive index of the touch electrode layer is greater than a refractive index of the at least one third inorganic material layer.

\* \* \* \* \*